(12) United States Patent
Kim et al.

(10) Patent No.: US 9,964,344 B2
(45) Date of Patent: May 8, 2018

(54) MAGNETIC COOLING APPARATUS

(71) Applicant: SAMSUNG ELECTRONICS CO., LTD., Suwon-si, Gyeonggi-do (KR)

(72) Inventors: Jin Han Kim, Suwon-si (KR); Il Ju Mun, Suwon-si (KR); Woo Hyek Choi, Yongin-si (KR); Young Dae Ko, Suwon-si (KR); Keon Kuk, Yongin-si (KR); Min Soo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 714 days.

(21) Appl. No.: 14/312,961

(22) Filed: Jun. 24, 2014

(65) Prior Publication Data

US 2015/0007582 A1 Jan. 8, 2015

(30) Foreign Application Priority Data

Jul. 4, 2013 (KR) .................. 10-2013-0078568

(51) Int. Cl.
*F25B 21/00* (2006.01)

(52) U.S. Cl.
CPC ........ *F25B 21/00* (2013.01); *F25B 2321/002* (2013.01); *F25B 2321/0021* (2013.01); *F25B 2321/0023* (2013.01); *Y02B 30/66* (2013.01)

(58) Field of Classification Search
CPC ............... F25B 21/00; F25B 2321/002; F25B 2321/0021; F25B 2321/0023
See application file for complete search history.

(56) References Cited

U.S. PATENT DOCUMENTS

| | | | | |
|---|---|---|---|---|
| 6,676,772 B2* | 1/2004 | Saito | ................. | H01F 1/015 148/301 |
| 6,826,915 B2* | 12/2004 | Wada | ................. | F25B 21/00 62/3.1 |

(Continued)

FOREIGN PATENT DOCUMENTS

| | | |
|---|---|---|
| CN | 1605009 | 4/2005 |
| CN | 101336356 | 12/2008 |

(Continued)

OTHER PUBLICATIONS

Patent Abstracts of Japan, Publication No. 2010-101576, Published May 6, 2010.

(Continued)

*Primary Examiner* — David Teitelbaum
*Assistant Examiner* — Filip Zec
(74) *Attorney, Agent, or Firm* — Staas & Halsey LLP

(57) ABSTRACT

A magnetic cooling apparatus including a plurality of magnetic regenerators including a plurality of magnetocaloric materials to emit heat when magnetized and to absorb heat when demagnetized. The magnetic regenerators are rotatably disposed on a circumference having a predetermined radius, at least one coil is disposed on the circumference and coupled to the magnetic regenerators, and a plurality of permanent magnets is provided inside and outside the circumference to generate a magnetic field to magnetize or demagnetize the magnetic regenerators. The at least one coil interacts with the magnetic field generated by the permanent magnets to rotate the magnetic regenerators. The coil interacting with the magnetic field to magnetize or demagnetize the magnetic regenerators is coupled to the magnetic regenerators such that the magnetic regenerators reciprocate or rotate, thereby minimizing a size of the magnetic cooling apparatus, relative to the use of a motor. In addition, a member to switch a channel of a heat transfer fluid directly (Continued)

performs heat transfer between the heat transfer fluid and an external fluid, thereby minimizing heat loss.

17 Claims, 29 Drawing Sheets

(56) References Cited

U.S. PATENT DOCUMENTS

| | | | |
|---|---|---|---|
| 7,173,507 B2* | 2/2007 | Ries | A61B 1/00158 335/299 |
| 7,481,064 B2 | 1/2009 | Kitanovski et al. | |
| 8,448,452 B2 | 5/2013 | Lee | |
| 8,754,569 B2* | 6/2014 | Kuo | H02N 10/00 310/306 |
| 9,377,221 B2* | 6/2016 | Benedict | F25B 21/00 |
| 2005/0120720 A1 | 6/2005 | Fang et al. | |
| 2007/0144181 A1 | 6/2007 | Kitanovski et al. | |
| 2008/0315049 A1 | 12/2008 | Bailo et al. | |
| 2009/0266083 A1 | 10/2009 | Shin et al. | |
| 2009/0308079 A1 | 12/2009 | Lee | |
| 2011/0048032 A1 | 3/2011 | Chang et al. | |
| 2011/0162388 A1 | 7/2011 | Barve et al. | |

FOREIGN PATENT DOCUMENTS

| | | |
|---|---|---|
| CN | 101341368 | 1/2009 |
| JP | 2010-101576 | 5/2010 |
| KR | 10-2007-0078484 | 8/2007 |
| KR | 10-2011-0048935 | 5/2011 |
| WO | 2008/007833 A1 | 1/2008 |
| WO | 2008/007834 A1 | 1/2008 |

OTHER PUBLICATIONS

Korea Intellectual Property Rights Information Service English Abstract of Korean Publication No. 10-2011-0048935, Published May 12, 2011.
Korea Intellectual Property Rights Information Service English Abstract of Korean Publication No. 10-2007-0078484, Published Aug. 1, 2007.
PCT International Search Report dated Oct. 16, 2014 in corresponding International Patent Application No. PCT/KR2014/005901.
Extended European Search Report dated Nov. 19, 2014 in corresponding European Patent Application No. 14174829.3.
Cover Sheet of European Patent Application No. 2 038 591 A0.
Australian Notice of Acceptance dated May 2, 2016 in corresponding Australian Patent Application No. 2014284858.
Chinese Office Action dated Mar. 20, 2017 in Chinese Patent Application No. 201480038033.3.
Chinese Office Action dated Oct. 18, 2017 in Chinese Patent Application No. 201480038033.3.

* cited by examiner

FIG. 5
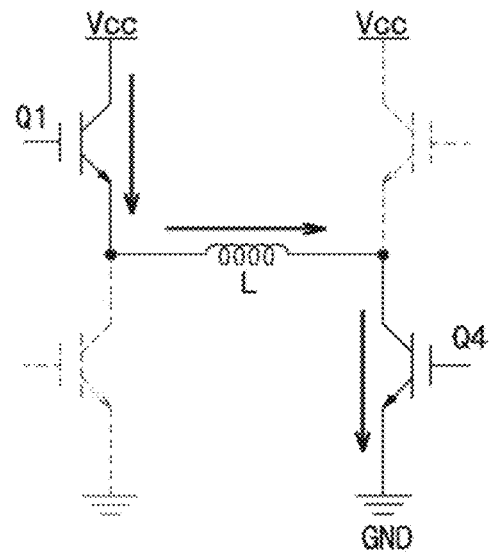
(a)
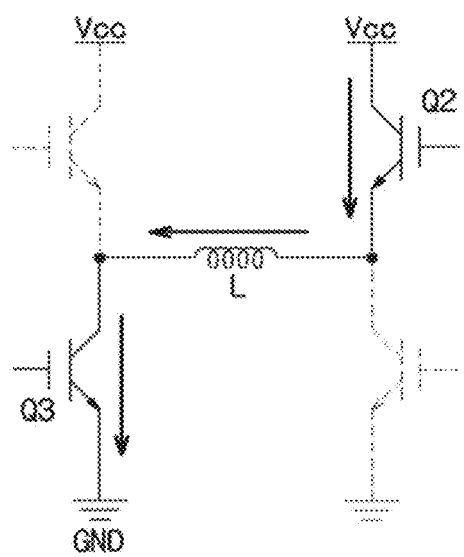
(b)

200a

FIG. 8
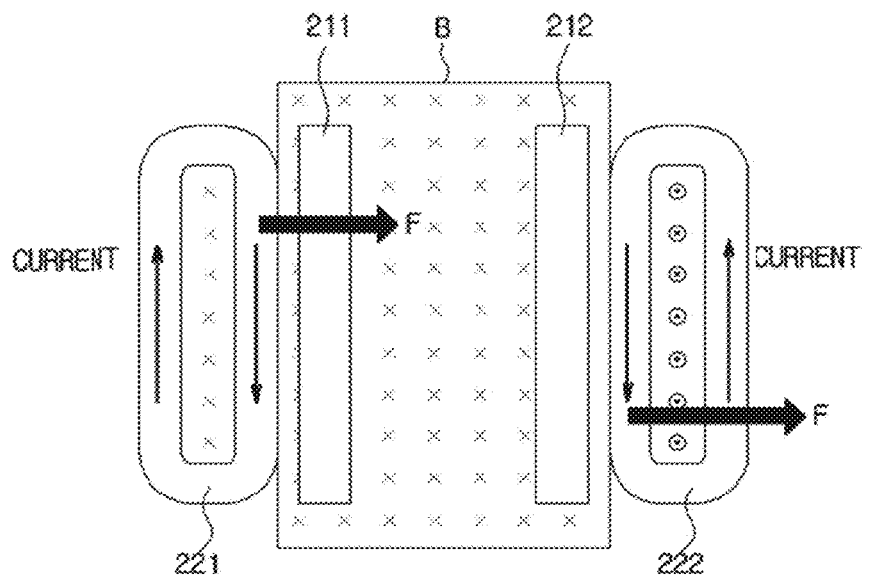
(a)
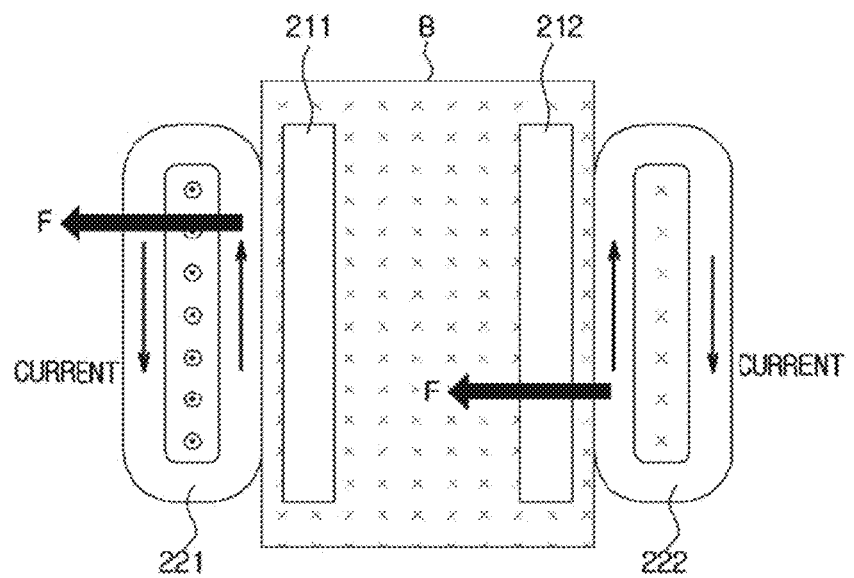
(b)

FIG. 9
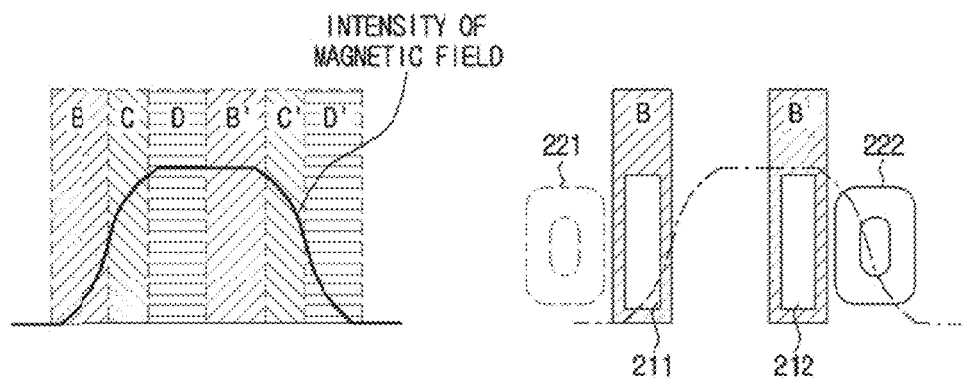
(a)
(b)
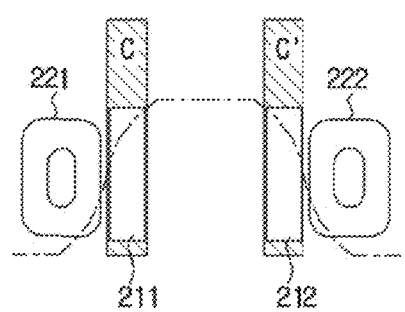
(c)
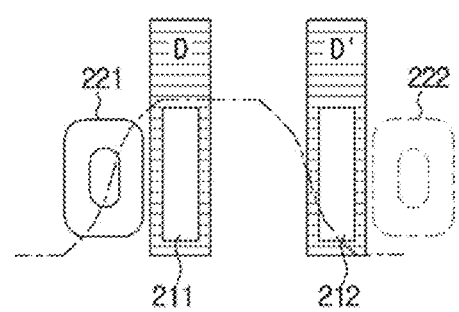
(d)

FIG. 14
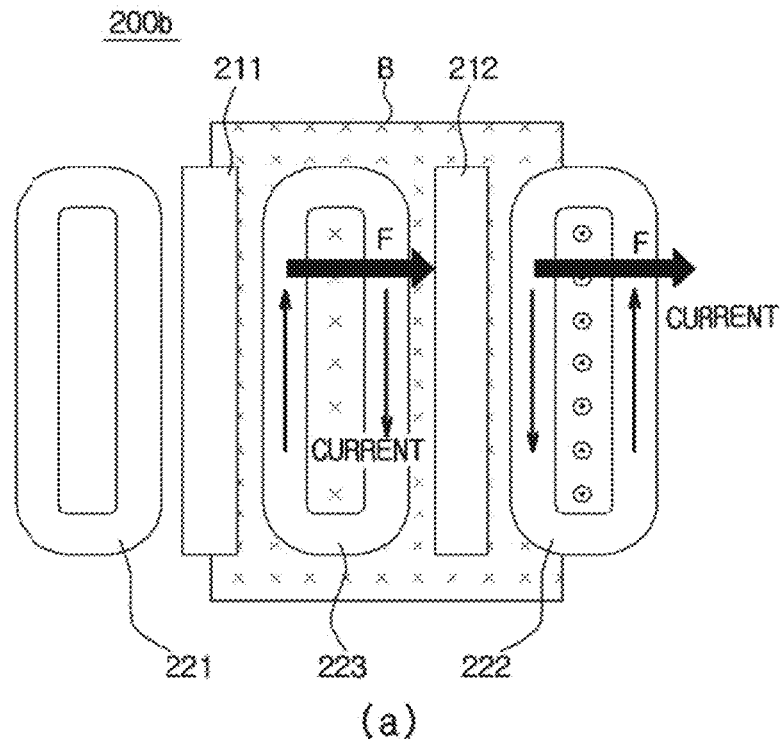
(a)
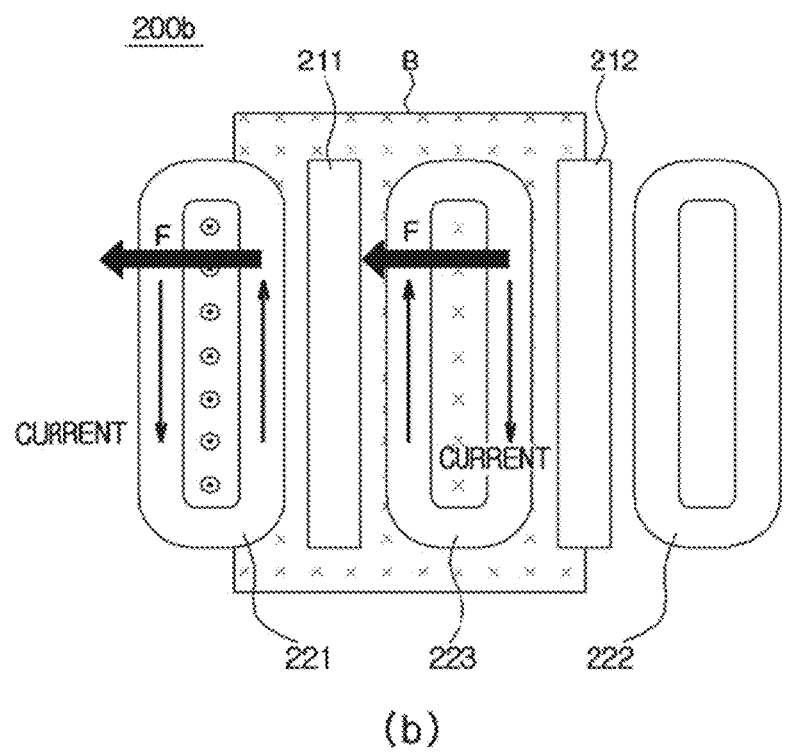
(b)

FIG. 20
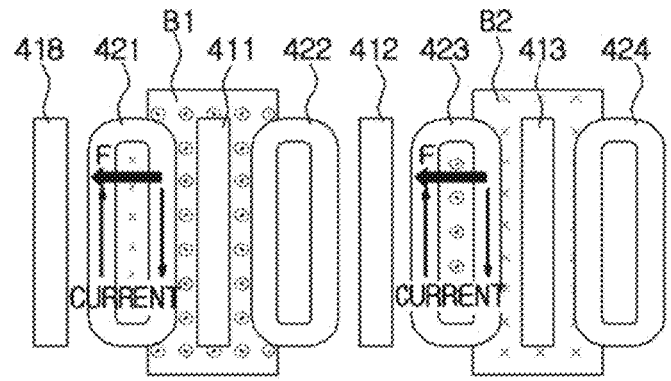
(a)
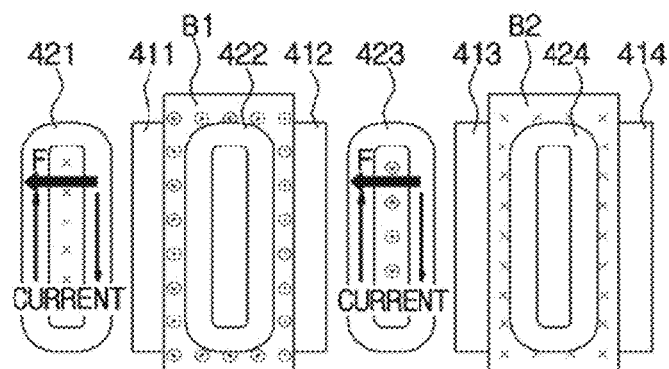
(b)
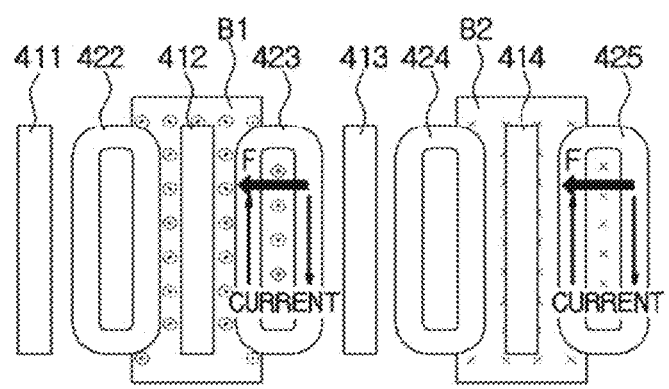
(c)

FIG. 21
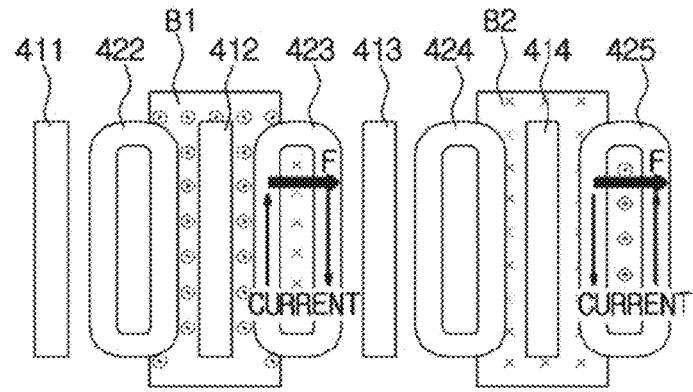
(a)
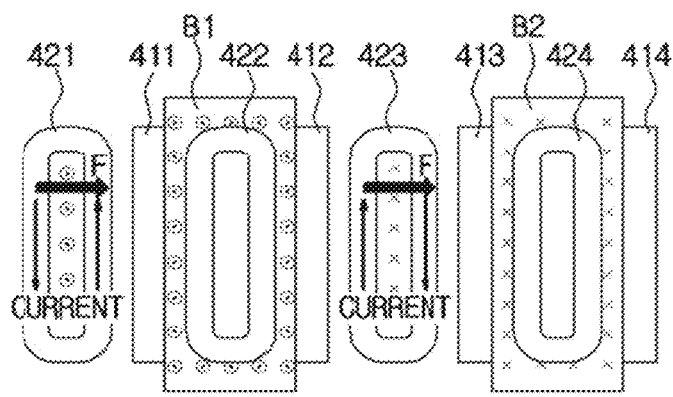
(b)
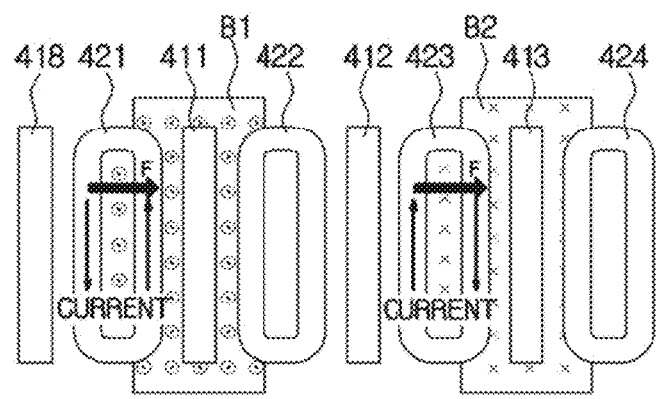
(c)

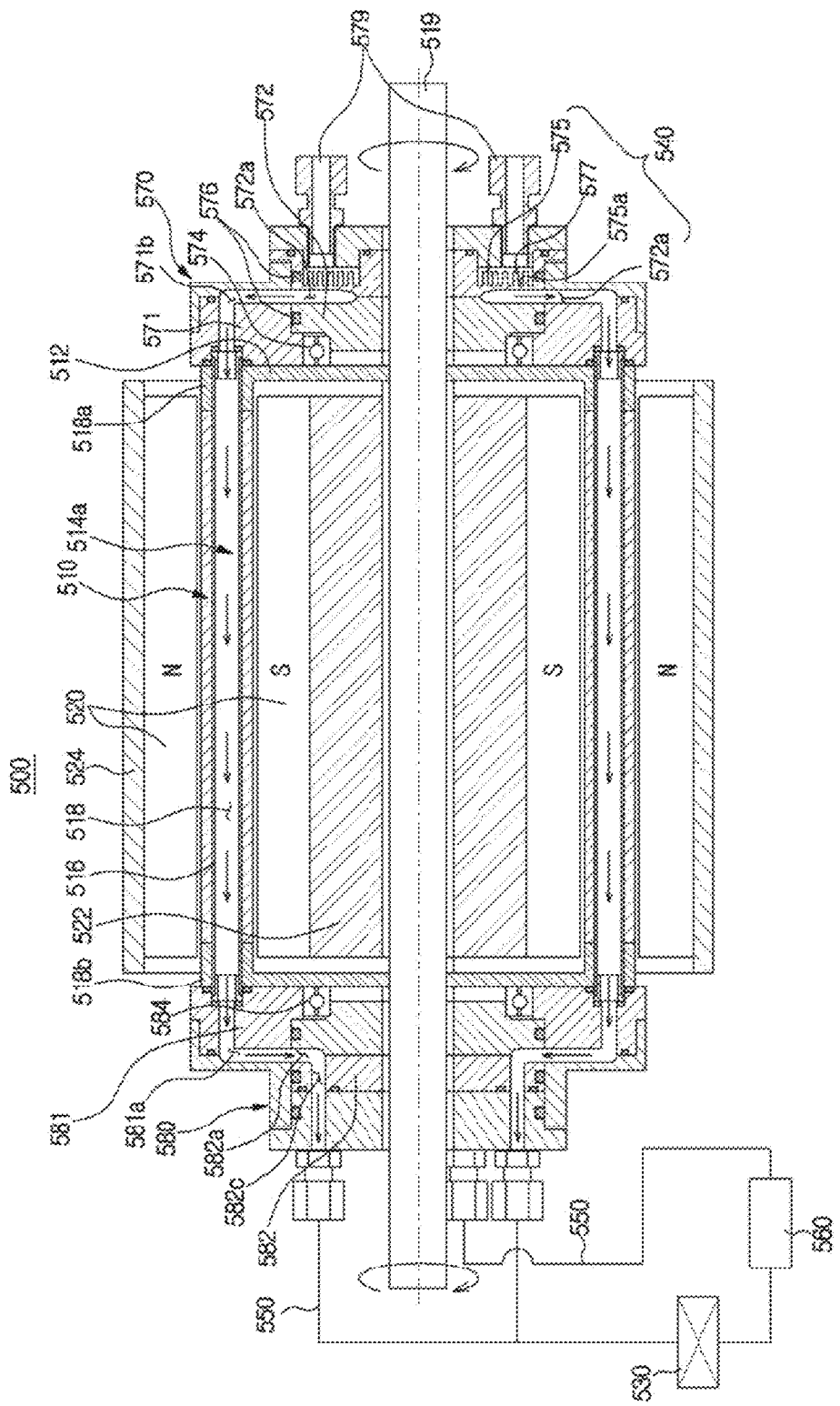

MAGNETIC COOLING APPARATUS

CROSS-REFERENCE TO RELATED APPLICATIONS

This application claims the benefit of Korean Patent Application No. 10-2013-0078568, filed on Jul. 4, 2013 in the Korean Intellectual Property Office, the disclosure of which is incorporated herein by reference.

BACKGROUND

1. Field of the Invention

Embodiments of the present invention relate to a cooling apparatus using a magnetocaloric effect.

2. Description of the Related Art

A cooling apparatus using heat exchange between a refrigerant, such as chlorofluorocarbon (CFC) or hydrochlorofluorocarbon (HCFC), and air generated during condensation and evaporation of the refrigerant has been widely used in domestic and industrial fields. However such a refrigerant causes environmental problems, such as destruction of an ozone layer and global warming. For this reason, various new type cooling apparatuses replacing the cooling apparatus using the refrigerant are now under study.

A typical cooling apparatus replacing the cooling apparatus using the refrigerant is a magnetic cooling apparatus. The magnetic cooling apparatus is a cooling apparatus using a magnetocaloric effect. Specifically, the magnetic cooling apparatus uses heat exchange between a magnetic material and air generated due to change of a magnetic field.

In a conventional magnetic cooling apparatus, at least one magnetic regenerator including a magnetic material rotates or reciprocates between inside and outside a magnet to cause change in temperature of the magnetic material included in the magnetic regenerator. In addition, a motor is used to rotate or reciprocate the magnetic regenerator.

However, it may be difficult to minimize the size of the magnetic cooling apparatus using the motor as a power source and the magnetic cooling apparatus has low energy efficiency.

In addition, in the conventional magnetic cooling apparatus, heat loss is generated during circulation of a heat transfer fluid in the magnetic cooling apparatus including a high-temperature side heat exchanger, a low-temperature side heat exchanger, and the magnetic regenerator.

SUMMARY

It is an aspect of the present invention to provide a magnetic cooling apparatus wherein a magnetic regenerator reciprocates or rotates without an additional power source, such as a motor, and heat loss generated during circulation of a heat transfer fluid in the magnetic cooling apparatus is minimized.

Additional aspects of the invention will be set forth in part in the description which follows and, in part, will be obvious from the description, or may be learned by practice of the invention.

In accordance with an aspect of the present invention, a magnetic cooling apparatus includes a plurality of magnetic regenerators including a plurality of magnetocaloric materials to emit heat when magnetized and to absorb heat when demagnetized, the magnetic regenerators being rotatably disposed on a circumference having a predetermined radius, at least one coil disposed on the circumference and coupled to the magnetic regenerators, and a plurality of permanent magnets provided inside and outside the circumference to generate a magnetic field to magnetize or demagnetize the magnetic regenerators, wherein the at least one coil interacts with the magnetic field generated by the permanent magnets to rotate the magnetic regenerators.

A coil located in a direction in which the magnetic regenerators are rotated on the basis of the magnetic field may generate a magnetic field having an opposite direction to the magnetic field.

When the magnetic regenerators are rotated by a predetermined angle, the coil located in the direction in which the magnetic regenerators are rotated on the basis of the magnetic field may generate a magnetic field having the same direction as the magnetic field.

A coil located in a direction opposite to a direction in which the magnetic regenerators are rotated on the basis of the magnetic field may generate a magnetic field having the same direction as the magnetic field.

When the magnetic regenerators are rotated by a predetermined angle, the coil located in the direction opposite to the direction in which the magnetic regenerators are rotated on the basis of the magnetic field may generate a magnetic field having an opposite direction to the magnetic field.

The magnetic cooling apparatus may further include at least one first channel switching valve coupled to one ends of the magnetic regenerators in an axial direction of the circumference to guide a heat transfer material discharged from a demagnetized magnetic regenerator to a magnetized magnetic regenerator, a heat exchanger in which the heat transfer material absorbs heat energy from the magnetized magnetic regenerator, and at least one second channel switching valve coupled to the other ends of the magnetic regenerators in the axial direction of the circumference to guide the heat transfer material discharged from the magnetized magnetic regenerator to the heat exchanger and to guide the heat transfer material discharged from the heat exchanger to the demagnetized magnetic regenerator.

The first channel switching valve may include a rotary unit including a first channel connected to the magnetized magnetic regenerator and a second channel connected to the demagnetized magnetic regenerator, the rotary unit rotating together with the magnetic regenerators, and a fixed unit including a connection channel connected between the first channel and the second channel, the fixed unit rotatably supporting the rotary unit.

The heat transfer material having transferred heat energy to the demagnetized magnetic regenerator may absorb heat energy from the fixed unit.

In accordance with another aspect of the present invention, a magnetic cooling apparatus includes a magnetic field generation member to generate a magnetic field, a magnetic regeneration member including a plurality of magnetic regenerators to emit heat energy when magnetized by the magnetic field and to absorb heat energy when demagnetized and at least one coil to move the magnetic regenerators using interaction with the magnetic field, and a channel switching member to guide a heat transfer material having passed through a demagnetized magnetic regenerator to a magnetized magnetic regenerator, wherein the heat transfer material having passed through the demagnetized magnetic regenerator cools the channel switching member.

At least one coil located in a direction in which the magnetic regeneration member is moved on the basis of the magnetic field may generate a magnetic field having an opposite direction to the magnetic field.

At least one coil located in a direction opposite to a direction in which the magnetic regeneration member is moved on the basis of the magnetic field may generate a magnetic field having the same direction as the magnetic field.

At least one coil leaving the magnetic field may not generate a magnetic field.

The magnetic regenerators may be disposed on the same plane and the at least one coil may be disposed outside the magnetic regenerators.

The magnetic regeneration member may generate a magnetic field perpendicular to the plane.

The magnetic regeneration member may reciprocate in a direction perpendicular to the magnetic field generated by the magnetic field generation member.

The magnetic regenerators may be disposed on a circumference of a cylinder and the at least one coil may be disposed between the magnetic regenerators.

The magnetic field generation member may generate a magnetic field in a radial direction of the cylinder.

The magnetic regeneration member may rotate in a direction perpendicular to the magnetic field generated by the magnetic field generation member.

In accordance with a further aspect of the present invention, a magnetic cooling apparatus includes a magnetic field generation member to generate a magnetic field, a magnetic regeneration member including a magnetic regenerator to emit heat energy when entering the magnetic field and to absorb heat energy when leaving the magnetic field and at least one coil to move the magnetic regenerator using interaction with the magnetic field, a position detection unit to detect position of the magnetic regeneration member, a driving unit to supply driving current to generate a variable magnetic field to the at least one coil, and a controller to control the driving unit such that the magnetic regenerator enters or leaves the magnetic field generated by the magnetic field generation member based on a detected result of the position detection unit.

Driving current to generate a magnetic field having an opposite direction to the magnetic field generated by the magnetic field generation member may be supplied to a coil located in a direction in which the magnetic regeneration member is moved on the basis of the magnetic field.

When the magnetic regeneration member is moved by a predetermined distance, driving current to generate a magnetic field having the same direction as the magnetic field generated by the magnetic field generation member may be supplied to the coil located in the direction in which the magnetic regeneration member is moved.

Driving current to generate a magnetic field having the same direction as the magnetic field generated by the magnetic field generation member may be supplied to a coil located in a direction opposite to a direction in which the magnetic regeneration member is moved on the basis of the magnetic field.

When the magnetic regeneration member is moved by a predetermined distance, driving current to generate a magnetic field having an opposite direction to the magnetic field generated by the magnetic field generation member may be supplied to the coil located in the direction opposite to the direction in which the magnetic regeneration member is moved.

BRIEF DESCRIPTION OF THE DRAWINGS

These and/or other aspects of the invention will become apparent and more readily appreciated from the following description of the embodiments, taken in conjunction with the accompanying drawings of which:

FIG. 5 is a view illustrating operation of the driving unit shown in FIG. 4;

FIGS. 8a and b are views illustrating reciprocation of a reciprocation type magnetic regeneration member according to an embodiment;

FIGS. 9a-d are views showing coils to which driving current is supplied when the reciprocation type magnetic regeneration member according to the embodiment reciprocates;

FIGS. 14a and b are views illustrating reciprocation of a reciprocation type magnetic regeneration member according to another embodiment;

FIGS. 19a-f, 20a-c and 21a-c are views illustrating reciprocating rotation of the rotation type magnetic regeneration member according to the embodiment;

FIGS. 27 and 28 are views showing flow of a heat transfer fluid flowing in the magnetic cooling apparatus according to the embodiment.

DETAILED DESCRIPTION

Figure 1A:
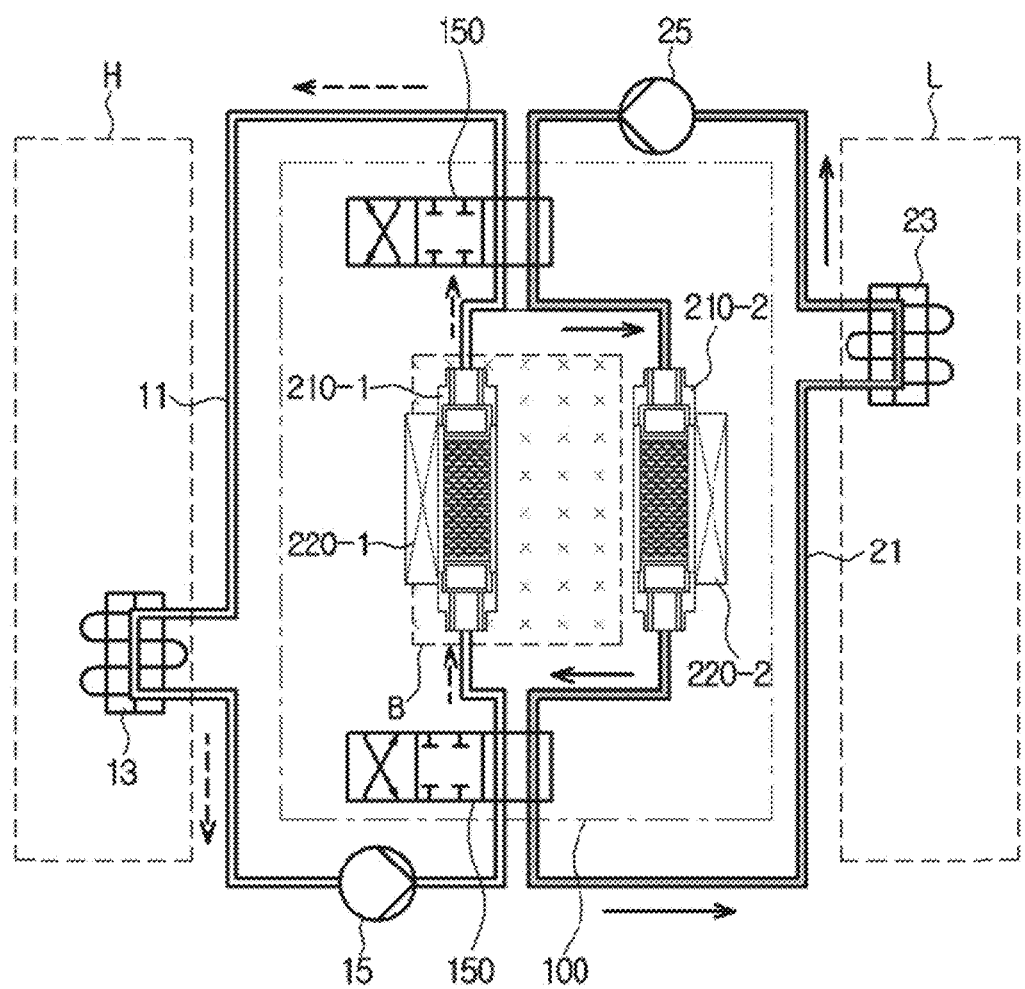
FIGS. 1a and b are views schematically showing a magnetic cooling apparatus according to an embodiment.

Reference will now be made in detail to the embodiments of the present invention, examples of which are illustrated in the accompanying drawings, wherein like reference numerals refer to like elements throughout.

Embodiments described in this specification and constructions shown in the drawings are merely preferred examples of the disclosed invention and it should be understood that there are various modifications replacing the embodiments of this specification and the drawings at the time of filing of the present application.

Figure 2:
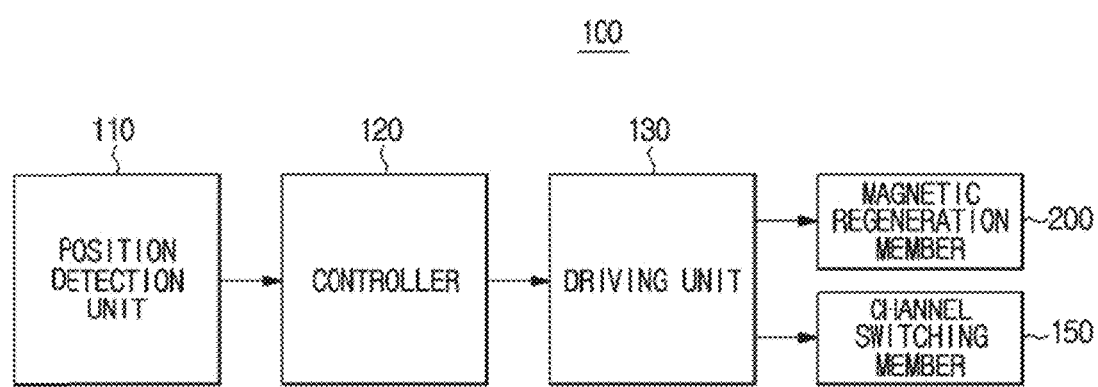
FIG. 2 is a control block diagram of a magnetic heat exchanger according to an embodiment.
Figure 3:
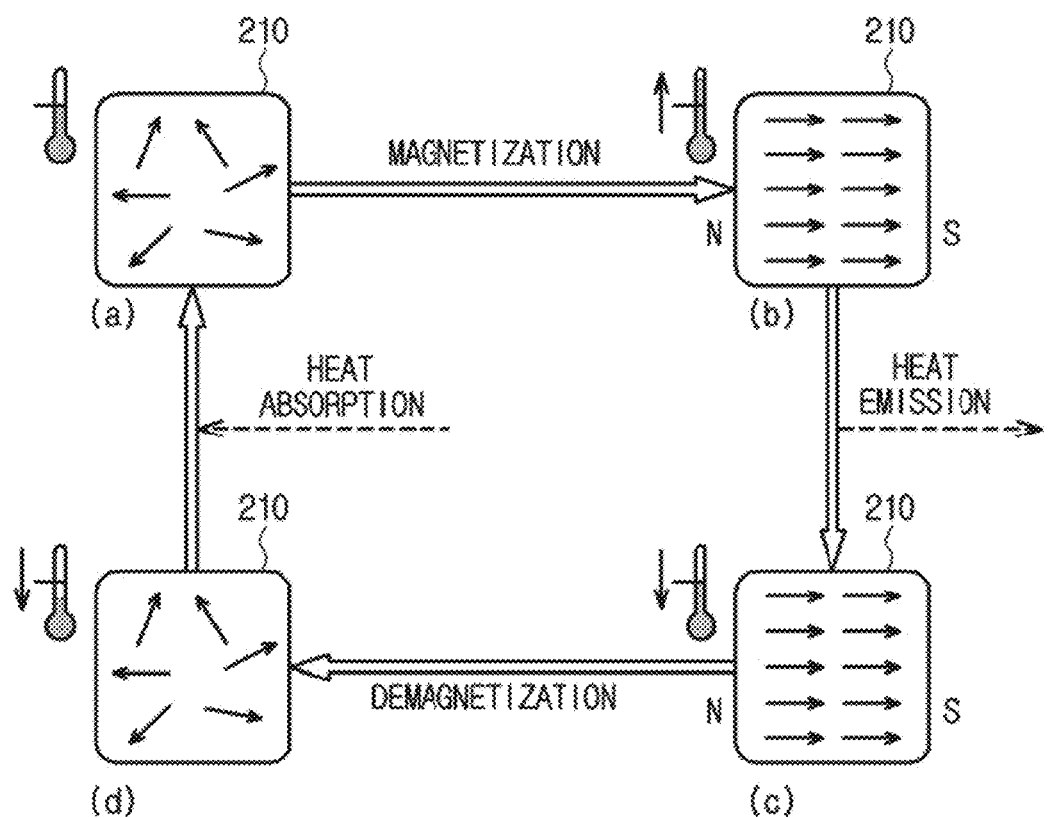
FIG. 3 is a view illustrating a heat exchange cycle of the magnetic heat exchanger according to the embodiment.
Figure 4:
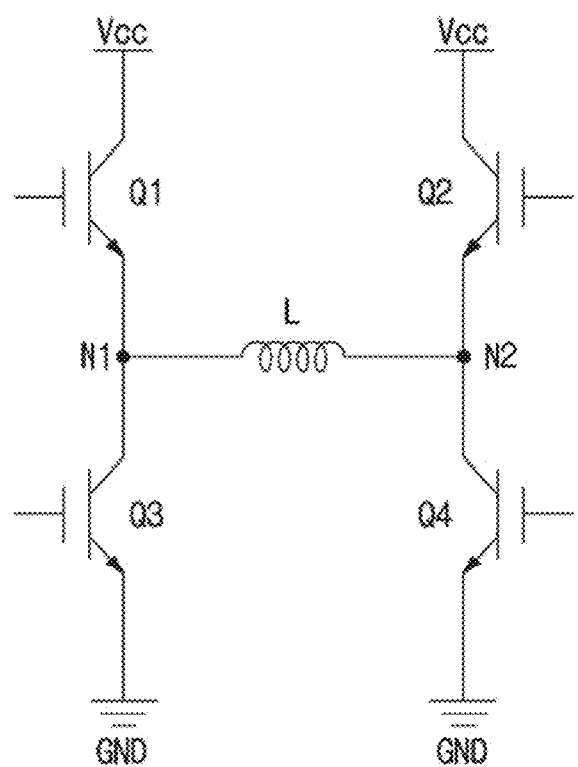
FIG. 4 is a view showing an example of a driving unit included in a magnetic regenerator driving device according to an embodiment.

FIGS. 1a and b are views schematically showing a magnetic cooling apparatus according to an embodiment, FIG. 2 is a control block diagram of a magnetic heat exchanger according to an embodiment, FIG. 3 is a view illustrating a heat exchange cycle of the magnetic heat exchanger according to the embodiment, FIG. 4 is a view showing an example of a driving unit included in a magnetic regenerator driving device according to an embodiment, and FIG. 5 is a view illustrating operation of the driving unit shown in FIG. 4.

Referring to FIGS. 1 and 2, a magnetic cooling apparatus 1 includes a transfer pipe 11 to guide a heat transfer fluid, a high-temperature side heat exchanger 13 provided on the transfer pipe 11 to perform heat exchange between a high temperature unit H and the heat transfer fluid, a low-temperature side heat exchanger 23 provided on the transfer pipe 21 to perform heat exchange between a low temperature unit L and the heat transfer fluid, a pump 15 provided at the transfer pipe 11 to circulate the heat transfer fluid therein, a pump 25 provided at the transfer pipe 21 to circulate the heat transfer fluid therein, and a magnetic heat exchanger 100 to exchange heat with the heat transfer fluid.

The heat transfer fluid may be a fluid that may flow in the transfer pipe 11. The heat transfer fluid absorbs heat energy from the low temperature unit L and transfers the absorbed heat energy to the magnetic heat exchanger 100. In addition, the heat transfer fluid absorbs heat energy from the magnetic heat exchanger 100 and transfers the absorbed heat energy to the high temperature unit H. Water, alcohol, an antifreeze solution such as ethylene glycol, helium gas, or a mixture thereof may be used as the heat transfer fluid.

The high-temperature side heat exchanger 13 is provided in the high temperature unit H such that the heat transfer fluid emits heat energy to the high temperature unit H. The low-temperature side heat exchanger 23 is provided in the low temperature unit L such that the heat transfer fluid absorbs heat energy from the low temperature unit L. The high-temperature side heat exchanger 13 and the low-temperature side heat exchanger 23 may include heat exchange fins (not shown) to improve heat exchange efficiency.

The pump 15 circulates the heat transfer fluid in the transfer pipe 11. In FIG. 1, the pump 15 circulates the heat transfer fluid in the transfer pipe 11 in a counterclockwise direction. However, embodiments of the present invention are not limited thereto. For example, the pump 15 may circulate the heat transfer fluid in the transfer pipe 11 in a clockwise direction.

The magnetic heat exchanger 100 includes a magnetic field generation member (not shown) to generate a magnetic field B, a magnetic regeneration member 200 to exchange heat with the heat transfer fluid while entering or leaving the magnetic field B, a channel switching member 150 to switch a flowing direction of the heat transfer fluid, a position detection unit 110 to detect position of the magnetic regeneration member 200, a driving unit 130 to supply driving current to the magnetic regeneration member 200, and a controller 120 to control the driving unit 130 based on a detected result of a position detection unit 110.

The magnetic regeneration member 200 includes a magnetic regenerator 210 to exchange heat with the heat transfer fluid while entering or leaving the magnetic field B and a coil 220 to move the magnetic regeneration member 200 using interaction with the magnetic field B.

A through hole (not shown) is formed in the magnetic regenerator 210. The through hole (not shown) is filled with a magnetocaloric material. The magnetocaloric material may be a magnetic material that is magnetized inside the magnetic field B and demagnetized outside the magnetic field B. In particular, the magnetocaloric material exhibits a magnetocaloric effect of emitting heat when magnetized and absorbing heat when demagnetized. A typical material exhibiting such a magnetocaloric effect may be gadolinium (Gd). Gadolinium (Gd) is an element having an atomic number of 344, a temperature of which increases inside the magnetic field and decreases outside the magnetic field. An alloy of gadolinium and erbium (Er) and an alloy of gadolinium, silicon (Si), and germanium (Ge) exhibit a higher magnetocaloric effect. In addition, a manganese-iron compound (MnFe) or a lanthanum-iron compound (LaFe) may be used as the magnetocaloric material. The magnetocaloric material is processed in the form of particles or fibers filling the through hole (not shown) in the magnetic regenerator 210. Such particle or fiber type magnetocaloric material has sufficient gaps such that the heat transfer fluid may pass through the through hole (not shown) in the magnetic regenerator 210.

In addition, the through hole (not shown) in the magnetic regenerator 210 is connected to the transfer pipe 11.

The magnetic regenerator 210 reciprocates or rotates to alternately enter or leave the magnetic field B generated by the magnetic field generation member (not shown). During reciprocation of the magnetic regenerator 210, the magnetic field B is formed in a direction perpendicular to the reciprocating direction of the magnetic regenerator 210. During rotation of the magnetic regenerator 210, the magnetic field B is formed in a radial direction of the magnetic regenerator 210.

Hereinafter, reciprocation of the magnetic regenerator 210 will be described as an example for easy understanding.

Figure 1B:
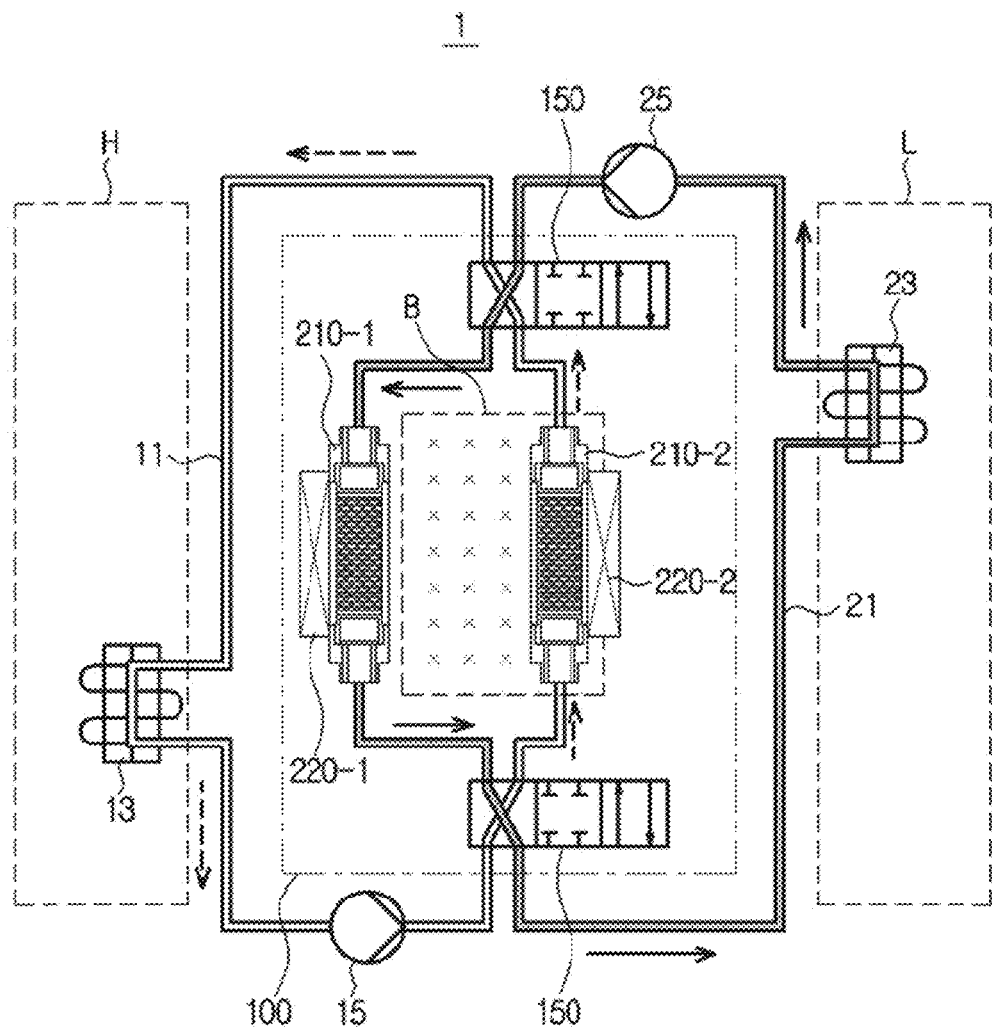

As shown in FIG. 1, the magnetic regenerator 210 may include a first magnetic regenerator 210-1 and a second magnetic regenerator 210-2. When the first magnetic regenerator 210-1 enters the magnetic field B, as shown in FIG. 1(a), the second magnetic regenerator 210-2 leaves the magnetic field B. As a result, the first magnetic regenerator 210-1 inside the magnetic field B is magnetized and the second magnetic regenerator 210-2 outside the magnetic field B is demagnetized. On the other hand, when the first magnetic regenerator 210-1 leaves the magnetic field B, as shown in FIG. 1(b), the second magnetic regenerator 210-2 enters the magnetic field B. As a result, the first magnetic regenerator 210-1 outside the magnetic field B is demagnetized and the second magnetic regenerator 210-2 inside the magnetic field B is magnetized.

In addition, the first magnetic regenerator 210-1 and the second magnetic regenerator 210-2 repetitively emit and absorb heat during repetitive magnetization and demagnetization of the first magnetic regenerator 210-1 and the second magnetic regenerator 210-2. Specifically, the first magnetic regenerator 210-1 or the second magnetic regenerator 210-2, when magnetized, emits heat to the heat transfer fluid. On the other hand, the first magnetic regenerator 210-1 or the second magnetic regenerator 210-2, when demagnetized, absorbs heat from the heat transfer fluid.

Heat exchange between the magnetic regenerator 210 and the heat transfer fluid will be described with reference to FIG. 3. In a state in which the magnetic field B is not generated, the magnetic regenerator 210 remains demagnetized. During demagnetization of the magnetic regenerator 210, magnetic dipoles in the magnetic regenerator 210 are irregularly arranged as shown in FIG. 3(a).

Subsequently, when the magnetic regenerator 210 enters the magnetic field B and is magnetized by the magnetic field B, the magnetic dipoles in the magnetic regenerator 210 are regularly arranged in a direction of the magnetic field B as shown in FIG. 3(b). The magnetic regenerator 210 emits energy corresponding to a difference between internal energy in the demagnetized state and internal energy in the magnetized state as heat energy. As a result, as shown in FIG. 3(b), temperature of the magnetic regenerator 210 increases.

In other words, when the magnetic regenerator 210 contacts the heat transfer fluid during magnetization of the magnetic regenerator 210, as shown in FIG. 3(c), the magnetic regenerator 210 transfers heat energy to the heat transfer fluid. As a result, temperature of the heat transfer fluid increases.

Subsequently, when the magnetic regenerator 210 leaves the magnetic field B and is demagnetized, the magnetic dipoles in the magnetic regenerator 210 are irregularly arranged as shown in FIG. 3(d). The magnetic regenerator 210 absorbs energy corresponding to a difference between internal energy in the demagnetized state and internal energy in the magnetized state as heat energy. As a result, as shown in FIG. 3(d), temperature of the magnetic regenerator 210 decreases.

In other words, when the magnetic regenerator 210 contacts the heat transfer fluid during demagnetization of the magnetic regenerator 210, as shown in FIG. 3(a), the magnetic regenerator 210 absorbs heat energy from the heat transfer fluid. As a result, temperature of the heat transfer fluid decreases.

In this way, the magnetic regenerator 210 transfers heat energy to the heat transfer fluid while the magnetic regenerator 210 is magnetized by the magnetic field B and absorbs heat energy from the heat transfer fluid while the magnetic regenerator 210 is demagnetized.

In FIG. 1, when the first magnetic regenerator 210-1 enters the magnetic field B generated by the magnetic field generation member (not shown) to transfer heat energy to the heat transfer fluid, the second magnetic regenerator 210-2 leaves the magnetic field B to absorb heat energy from the heat transfer fluid. On the other hand, when the first magnetic regenerator 210-1 leaves the magnetic field B to absorb heat energy from the heat transfer fluid, the second magnetic regenerator 210-2 enters the magnetic field B to transfer heat energy to the heat transfer fluid. In this way, the first and second magnetic regenerators 210 alternately enter and leave the magnetic field B to transfer heat energy to the heat transfer fluid or to absorb heat energy from the heat transfer fluid.

When driving current from the driving unit 130 is supplied to the coil 220, the coil 220 generates a magnetic field varying depending upon position of the magnetic regeneration member 200. The magnetic regeneration member 200 moves according to interaction between the varying magnetic field and the magnetic field B generated by the magnetic field generation member (not shown). That is, the coil 220 reciprocates or rotates the magnetic regeneration member 200 such that the magnetic regenerator 210 enters or leaves the magnetic field B.

Hereinafter, a magnetic regeneration member reciprocating to enter or leave a magnetic field will be referred to as a reciprocation type magnetic regeneration member and a magnetic heat exchanger including the reciprocation type magnetic regeneration member will be referred to as a reciprocation type magnetic heat exchanger. On the other hand, a magnetic regeneration member rotating about a shaft in a clockwise direction or in a counterclockwise direction to enter or leave a magnetic field will be referred to as a rotation type magnetic regeneration member and a magnetic heat exchanger including the rotation type magnetic regeneration member will be referred to as a rotation type magnetic heat exchanger.

The position detection unit 110 detects a position of the magnetic regeneration member 200. The form of the position detection unit 110 may vary depending upon that of the magnetic regeneration member 200. For example, in the reciprocation type magnetic regeneration member, a position of the magnetic regenerator may be detected using a linear encoder including a light emitting unit (not shown) to emit light, a light receiving unit (not show) to receive the light emitted by the light emitting unit (not shown), and a plate (not shown) having slits arranged at predetermined intervals along a reciprocation course of the reciprocation type magnetic regenerator. On the other hand, in the rotation type magnetic regeneration member, a position of the magnetic regenerator may be detected using a rotary encoder including a light emitting unit (not shown) to emit light, a light receiving unit (not show) to receive the light emitted by the light emitting unit (not shown), and a plate (not shown) having slits arranged at predetermined intervals in a circumferential direction in which the rotation type magnetic regenerator rotates.

The driving unit 130 may include an H-bridge circuit. In a case in which the magnetic regeneration member 200 includes a plurality of coils 220, the driving unit 130 may include a plurality of H-bridge circuits to supply driving current to the respective coils 220.

As shown in FIG. 4, the H-bridge circuit includes four switches Q1, Q2, Q3, and Q4. The first switch Q1 and the third switch Q3 are connected to each other in series between a direct current power source Vcc and a ground gnd. The second switch Q2 and the fourth switch Q4 are also connected to each other in series between the direct current power source Vcc and the ground gnd. Between a first node N1, at which first switch Q1 and the third switch Q3 are connected to each other in series, and a second node N2, at which second switch Q2 and the fourth switch Q4 are connected to each other in series, is provided a coil L, which is a portion of the coil 220.

Operation of the H-bridge circuit will be described with reference to FIG. 5. One of the series-connected switches Q1 and Q3 and one of the series-connected switches Q2 and Q4 are turned on such that current flows in the coil L. For example, when the first switch Q1 and the fourth switch Q4 are turned on as shown in FIG. 5(a), current flows in the coil L to the right in FIG. 4. On the other hand, when the second switch Q2 and the third switch Q3 are turned on as shown in FIG. 5(b), current flows in the coil L to the left in FIG. 4. That is, current may flow in the coil L in the forward direction (to the right) or in the reverse direction (to the left) according to on/off of the four switches Q1, Q2, Q3, and Q4 and the coil L may generate magnetic fields having opposite directions according to the flow directions of the current.

The controller 120 controls the H-bridge circuit of the driving unit 130 based on position of the magnetic regeneration member 200 detected by the position detection unit 110 to control driving current supplied to the coil 220 of the magnetic regeneration member 200. For example, in the reciprocation type magnetic regeneration member, the controller 120 controls driving current supplied to the coil 220 of the magnetic regeneration member 200 such that the magnetic regenerator 210 repeatedly enters and leaves the magnetic field B. On the other hand, in the rotation type magnetic regeneration member, the controller 120 controls driving current supplied to the coil 220 of the magnetic regeneration member 200 such that the magnetic regenerator 210 rotates about the shaft.

In addition, the controller 120 may include a pulse width modulation circuit (not shown) to adjust magnitude of driving current supplied to the coil 220 of the magnetic regeneration member 200 by the driving unit 130. For example, in a case in which driving current is supplied to the coil L (see FIG. 4) in the forward direction (to the right), the fourth switch Q4 (see FIG. 4) remains closed and the first switch Q1 (see FIG. 4) is repeatedly turned on and off to adjust magnitude of driving current flowing in the coil L (see FIG. 4). Specifically, when turn-on time of the first switch Q1 (see FIG. 4) is increased, magnitude of driving current flowing in the coil L may increase. On the other hand, when turn-off time of the first switch Q1 (see FIG. 4) is increased, magnitude of driving current flowing in the coil L may decrease. The controller 120 may control the driving unit 130 to supply sinusoidal driving current to the coil 220 of the magnetic regeneration member 200 using such a pulse width modulation circuit (not shown).

A channel switching member 150 switches a channel of the heat transfer material passing through the through hole (not shown) provided in the magnetic regenerator 210. The channel switching member 150 includes a first channel switching valve 150-1 to switch a channel of the heat transfer material discharged to the low-temperature side heat exchanger 23 or introduced from the low-temperature side heat exchanger 23 and a second channel switching valve 150-2 to switch a channel of the heat transfer material discharged to the high-temperature side heat exchanger 13 or introduced from the high-temperature side heat exchanger 13.

The first channel switching valve 150-1 and the low-temperature side heat exchanger 23 may be integrated or the second channel switching valve 150-2 and the high-temperature side heat exchanger 13 may be integrated to minimize heat loss on the channel. For example, when the first channel switching valve 150-1 and the low-temperature side heat exchanger 23 are integrated, the heat transfer material, cooled while passing through the demagnetized magnetic regenerator, exchanges heat with an external fluid (air in a storage chamber, indoor air, etc.) at the low-temperature side heat exchanger 23 without passing through the transfer pipe, thereby improving cooling efficiency of the magnetic cooling apparatus 1. On the other hand, when the second channel switching valve 150-2 and the high-temperature side heat exchanger 13 are integrated, the heat transfer material, heated while passing through the magnetized magnetic regenerator, exchanges heat with an external fluid (indoor air, etc.) at the high-temperature side heat exchanger 13 without passing through the transfer pipe, thereby improving heating efficiency of the magnetic cooling apparatus 1.

In the following description, it is assumed that the first channel switching valve 150-1 and the low-temperature side heat exchanger 23 are integrated for easy understanding.

The heat transfer material flows as follows. The heat transfer material, transferred from the pump 25, is introduced into the demagnetized magnetic regenerator (the second magnetic regenerator 210-2 in FIG. 1(a) or the first magnetic regenerator 210-1 in FIG. 1(b)) through the second channel switching valve 150-2. While the heat transfer material passes through the demagnetized magnetic regenerator, the demagnetized magnetic regenerator absorbs heat energy from the heat transfer material. As a result, the heat transfer material is cooled. The cooled heat transfer material is introduced into the low-temperature side heat exchanger 23 through the first channel switching valve 150-1. While passing through the low-temperature side heat exchanger 23, the heat transfer material absorbs heat energy from the low temperature unit L. The heat transfer material having absorbed the heat energy from the low temperature unit L is introduced into the magnetized magnetic regenerator (the first magnetic regenerator 210-1 in FIG. 1(a) or the second magnetic regenerator 210-2 in FIG. 1(b)) through the first channel switching valve 150-1. While the heat transfer material passes through the magnetized magnetic regenerator, the magnetized magnetic regenerator emits heat energy to the heat transfer material. As a result, the heat transfer material is heated. The heated heat transfer material is introduced into the high-temperature side heat exchanger 13 through the second channel switching valve 150-2. While passing through the high-temperature side heat exchanger 13, the heat transfer material emits heat energy to the high temperature unit H.

In conclusion, the magnetic cooling apparatus 1 transfers heat energy from the low temperature unit L to the high temperature unit H to cool the low temperature unit L and to heat the high temperature unit H. In a case in which the magnetic cooling apparatus 1 is applied to a refrigerator, the low-temperature side heat exchanger 23 may be provided in a storage chamber of the refrigerator and the high-temperature side heat exchanger 13 may be provided outside the refrigerator to cool the storage chamber of the refrigerator. On the other hand, in a case in which the magnetic cooling apparatus 1 is applied to an air conditioner, the low-temperature side heat exchanger 23 may be provided indoors and the high-temperature side heat exchanger 13 may be provided outdoors to cool indoor air.

Hereinafter, operation of the magnetic regeneration member will be described in further detail.

Figure 6:
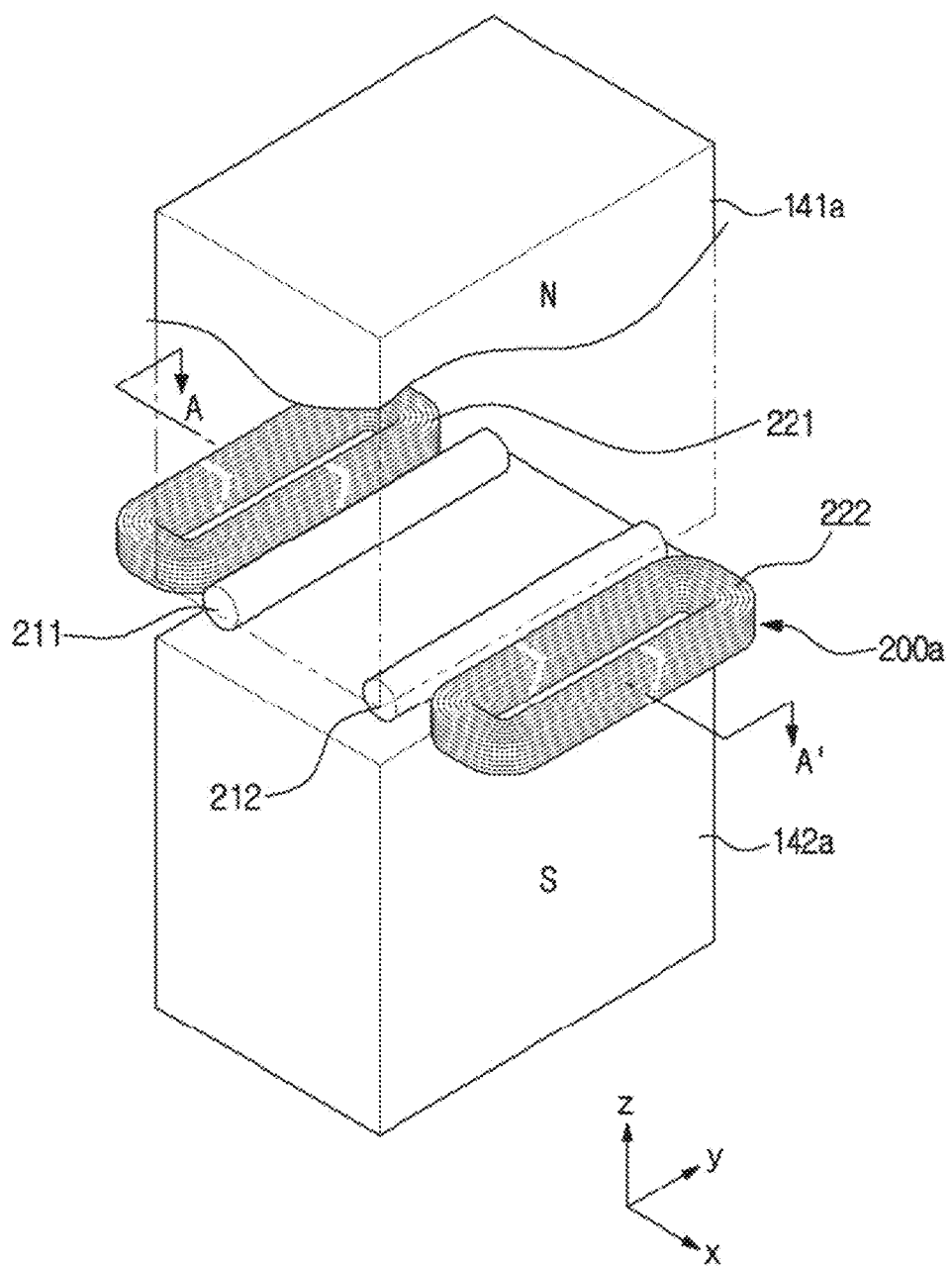
FIG. 6 is a view showing a reciprocation type magnetic heat exchanger according to an embodiment.
Figure 7:
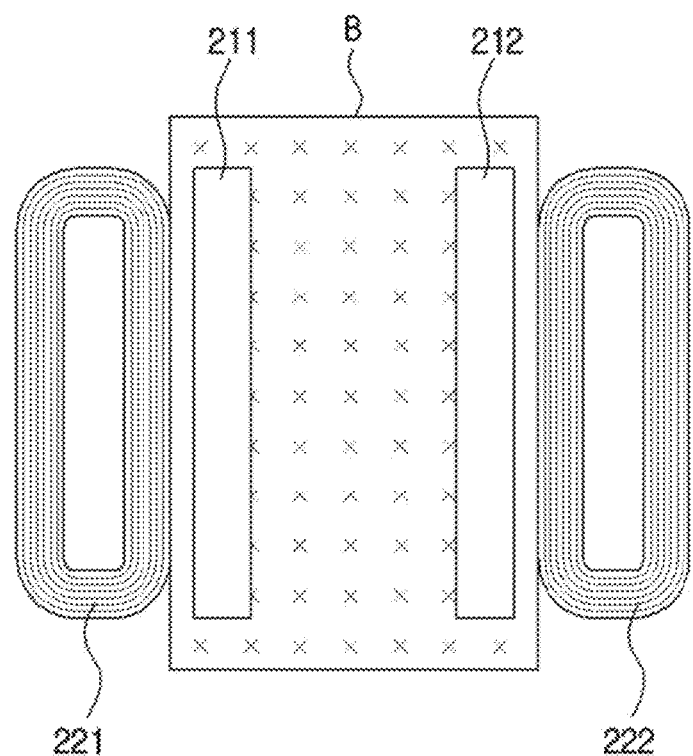
FIG. 7 is a view taken along line A-A' of FIG. 6.

FIG. 6 is a view showing a reciprocation type magnetic heat exchanger according to an embodiment and FIG. 7 is a view taken along line A-A' of FIG. 6.

Referring to FIGS. 6 and 7, a reciprocation type magnetic heat exchanger 100a includes a reciprocation type magnetic regeneration member 200a, magnetic field generation members 141a and 142a to generate a magnetic field B perpendicular to the reciprocation type magnetic regeneration member 200a, and a reciprocation type channel switching member (not shown) to switch a channel of a heat transfer material.

The magnetic field generation members 141a and 142a include a first permanent magnet and a second permanent magnet, respectively, disposed in parallel. The first permanent magnet and the second permanent magnet are disposed such that different polarities are opposite to each other in a state in which the reciprocation type magnetic regeneration member 200a is disposed therebetween.

The reciprocation type magnetic regeneration member 200a includes a first magnetic regenerator 211 and a second magnetic regenerator 212 provided in parallel in a direction perpendicular to the magnetic field B. A first coil 221 and a second coil 222 are provided outside the first magnetic regenerator 211 and the second magnetic regenerator 212 respectively. The first magnetic regenerator 211 and the second magnetic regenerator 212 are parallel.

In the reciprocation type magnetic regeneration member 200a, the first magnetic regenerator 211, the second magnetic regenerator 212, the first coil 221, and the second coil 222 are integrated to reciprocate in a direction perpendicular to the magnetic field B generated by the magnetic field generation members 141a and 142a.

FIGS. 8a and b are views illustrating reciprocation of a reciprocation type magnetic regeneration member according to an embodiment.

Referring to FIG. 8(a), clockwise driving current flows in the first coil 221, counterclockwise driving current flows in the second coil 222, and the reciprocation type magnetic regeneration member 200a moves to the right.

First, operation of the first coil 221 will be described. When clockwise driving current flows in the first coil 221, a magnetic field having the same direction as the magnetic field B generated by the magnetic field generation members 141a and 142a is generated in the first coil 221 according to Ampere's right-hand rule. As a result, attractive force is generated between the magnetic field generation members 141a and 142a and the first coil 221. Consequently, the first coil 221 moves the reciprocation type magnetic regeneration member 200a to the right.

When counterclockwise driving current flows in the second coil 222, a magnetic field having an opposite direction to the magnetic field B generated by the magnetic field generation members 141a and 142a is generated in the second coil 222 according to Ampere's right-hand rule. As a result, repulsive force is generated between the magnetic field generation members 141a and 142a and the second coil 222. Consequently, the second coil 222 moves the reciprocation type magnetic regeneration member 200a to the right.

In another aspect, in FIG. 6, a −z axis magnetic field B is generated by the magnetic field generation members 141a and 142a and −y axis driving current flows in the right half of the first coil 221, through which the −z axis magnetic field B passes. As a result, +x axis electromagnetic force (Lorentz's force) is generated according to Fleming's left-hand rule. The +x axis electromagnetic force moves the first coil 221 and the first magnetic regenerator 211 in a +x axis direction, i.e. to the right in FIG. 8(a). In addition, −y axis driving current also flows in the left half of the second coil 222, through which the −z axis magnetic field B passes. As a result, +x axis electromagnetic force is generated to move the second coil 222 and the second magnetic regenerator 212 to the right in FIG. 8.

On the other hand, when counterclockwise driving current flows in the first coil 221 and clockwise driving current flows in the second coil 222, the reciprocation type magnetic regeneration member 200a moves to the left as shown in FIG. 8(b).

When counterclockwise driving current flows in the first coil 221, a magnetic field having an opposite direction to the magnetic field B generated by the magnetic field generation members 141a and 142a is generated in the first coil 221 according to Ampere's right-hand rule. As a result, repulsive force is generated between the magnetic field generation members 141a and 142a and the first coil 221. Consequently, the first coil 221 moves the reciprocation type magnetic regeneration member 200a to the left.

When clockwise driving current flows in the second coil 222, a magnetic field having the same direction as the magnetic field B generated by the magnetic field generation members 141a and 142a is generated in the second coil 222 according to Ampere's right-hand rule. As a result, attractive force is generated between the magnetic field generation members 141a and 142a and the second coil 222. Consequently, the second coil 222 moves the reciprocation type magnetic regeneration member 200a moves to the left.

As described above, the reciprocation type magnetic heat exchanger 100a controls directions of driving current flowing in the first coil 221 and the second coil 222 to move the reciprocation type magnetic regeneration member 200a to the left or the right such that the reciprocation type magnetic regeneration member 200a repeatedly enters and leaves the magnetic field B.

During movement of the magnetic regeneration member 200a, one of the first coil 221 and the second coil 222 leaves the magnetic field B generated by the magnetic field generation members 141a and 142a. The coil 221 or 222 leaving the magnetic field B does not contribute to movement of the reciprocation type magnetic regeneration member 200a. Consequently, driving current may not be supplied to the coil 221 or 222 leaving the magnetic field B to improve power efficiency.

FIGS. 9a-d are views showing coils to which driving current is supplied when the reciprocation type magnetic regeneration member according to the embodiment reciprocates.

FIG. 9(a) shows intensity of the magnetic field B on a movement course of the reciprocation type magnetic regeneration member 200a, and intensity of the magnetic field B generated by the magnetic field generation members 141a and 142a (see FIG. 6) is relatively uniform in the central portion of the magnetic field generation members 141a and 142a. However, magnetic flux does not concentrate at the edge portion of the magnetic field generation members 141a and 142a but spreads to opposite sides with the result that intensity of the magnetic field B gradually decreases.

As shown in FIG. 9(a), the movement course of the reciprocation type magnetic regeneration member 200a may be divided into 6 zones based on intensity of the magnetic field B. Specifically, the movement course of the reciprocation type magnetic regeneration member 200a may be divided into B zone in which intensity of the magnetic field B increases from 0 to about the half of the maximum intensity, C zone in which intensity of the magnetic field B increases from about the half of the maximum intensity to the maximum intensity, D zone from a portion in which intensity of the magnetic field B is maintained at the maximum intensity to the center of the magnetic field generation members 141a and 142a (see FIG. 6), B' zone from the center of the magnetic field generation members 141a and 142a (see FIG. 6) to a portion in which intensity of the magnetic field B is maintained at the maximum intensity, C' zone in which intensity of the magnetic field B decreases from the maximum intensity to about the half of the maximum intensity, and D' zone in which intensity of the magnetic field B decreases from about the half of the maximum intensity to 0, which are sequentially arranged from the left of FIG. 9(a).

The distance between the first magnetic regenerator 211 and the second magnetic regenerator 212 and the width of the magnetic field generation members 141a and 142a (see FIG. 6) are adjusted such that the second magnetic regenerator 212 is located in B' zone when the first magnetic regenerator 211 is located in B zone, the second magnetic regenerator 212 is located in C' zone when the first magnetic regenerator 211 is located in C zone, and the second magnetic regenerator 212 is located in D' zone when the first magnetic regenerator 211 is located in D zone.

When the first magnetic regenerator 211 is located in B zone and the second magnetic regenerator 212 is located in B' zone, the first coil 221 is located outside the magnetic field B and the second coil 222 is located in C' zone, in which intensity of the magnetic field B is relatively high, as shown in FIG. 9(b). As a result, the first coil 221 located outside the magnetic field B does not contribute to movement of the reciprocation type magnetic regeneration member 200a and the second coil 222 located in C' zone, in which intensity of the magnetic field B is relatively high, may generate relatively large Lorentz's force. Consequently, the reciprocation type magnetic heat exchanger 100a (see FIG. 6) does not supply driving current to the first coil 221 but supplies driving current to the second coil 222 to move the reciprocation type magnetic regeneration member 200a.

When the first magnetic regenerator 211 is located in C zone and the second magnetic regenerator 212 is located in C' zone, the first coil 221 and the second coil 222 are respectively located in D zone and D' zone, in which intensity of the magnetic field B is relatively low, as shown in FIG. 9(c). As a result, the first coil 221 and the second coil 222 contribute to movement of the reciprocation type magnetic regeneration member 200a. Consequently, the reciprocation type magnetic heat exchanger 100a (see FIG. 6) supplies driving current to both the first coil 221 and the second coil 222 to move the reciprocation type magnetic regeneration member 200a.

When the first magnetic regenerator 211 is located in D zone and the second magnetic regenerator 212 is located in D' zone, the first coil 221 is located in C zone, in which intensity of the magnetic field B is relatively high, and the second coil 222 is located outside the magnetic field B as shown in FIG. 9(d). As a result, the second coil 222 located outside the magnetic field B does not contribute to movement of the reciprocation type magnetic regeneration member 200a and the first coil 221 located in C zone, in which intensity of the magnetic field B is relatively high, may generate relatively large Lorentz's force. Consequently, the reciprocation type magnetic heat exchanger 100a (see FIG. 6) does not supply driving current to the second coil 222 but supplies driving current to the first coil 221 to move the reciprocation type magnetic regeneration member 200a.

FIGS. 10a-f are views showing current flowing in the coils when the reciprocation type magnetic regeneration member according to the embodiment moves to the left.

Figure 10:
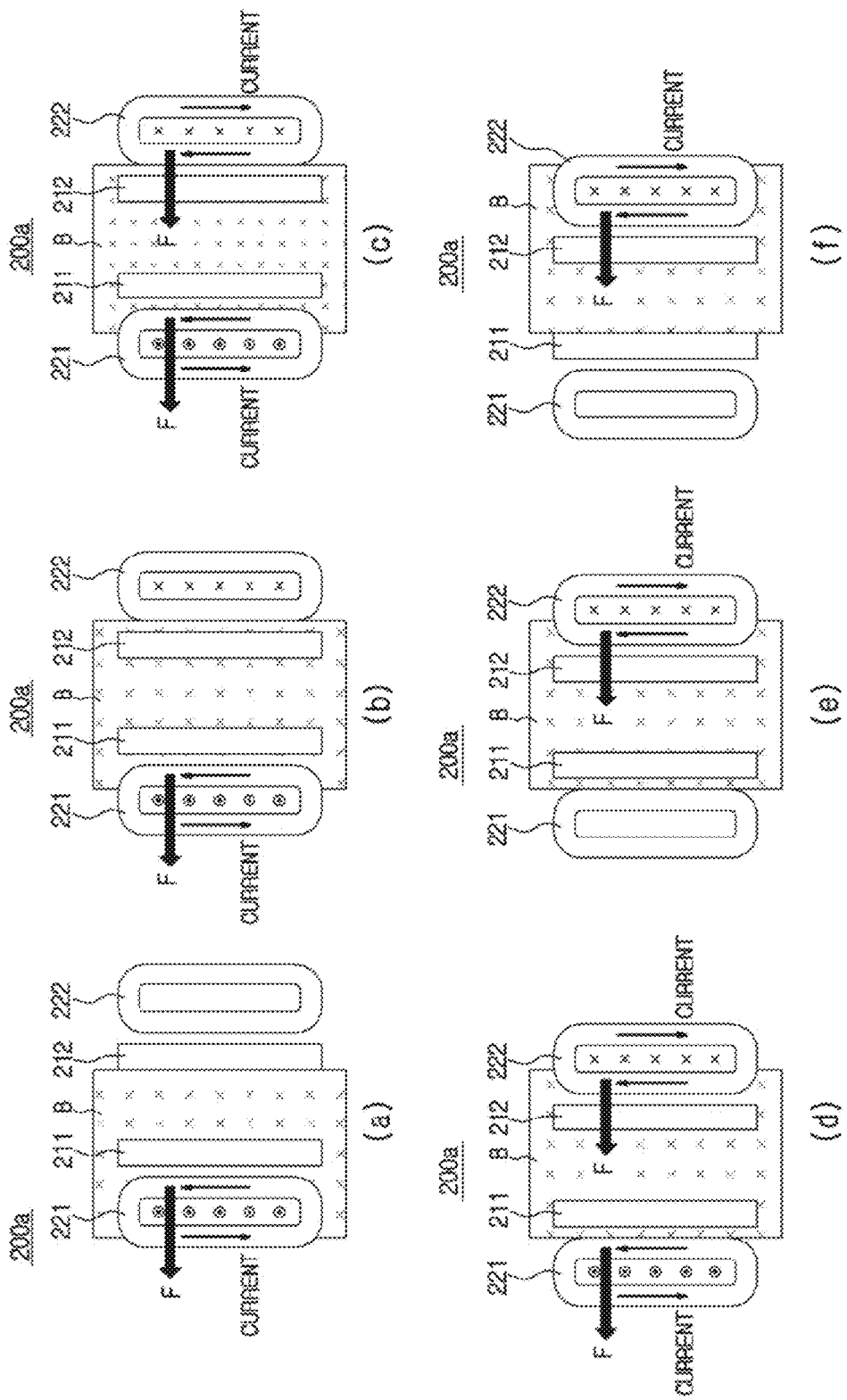
FIGS. 10a-f are views showing current flowing in the coils when the reciprocation type magnetic regeneration member according to the embodiment moves to the left.

Until the second coil 222 enters the magnetic field B from a position where the second magnetic regenerator 212 is located outside the magnetic field B, the second coil 222 does not contribute to movement of the reciprocation type magnetic regeneration member 200a. As shown in FIGS. 10(a) and 10(b), therefore, counterclockwise driving current is supplied to the first coil 221 but no driving current is supplied to the second coil 222. As a result, the first coil 221 moves the reciprocation type magnetic regeneration member 200a to the left using repulsive force generated between the first coil 221 and the magnetic field generation members 141a and 142a (see FIG. 6) to generate the magnetic field B until the second coil 222 enters the magnetic field B.

Until the first coil 221 leaves the magnetic field B after the second coil 222 enters the magnetic field B, driving current is supplied to both the first coil 221 and the second coil 222 as shown in FIGS. 10(c) and 10(d). When entering the magnetic field B, the second coil 222 may contribute to movement of the reciprocation type magnetic regeneration member 200a. Consequently, the reciprocation type magnetic heat exchanger 100a (see FIG. 6) supplies counterclockwise driving current to the first coil 221 and clockwise driving current to the second coil 222. As a result, the first coil 221 and the second coil 222 move the reciprocation type magnetic regeneration member 200a to the left using repulsive force generated between the first coil 221 and the magnetic field generation members 141a and 142a (see FIG. 6) and attractive force generated between the second coil 222 and the magnetic field generation members 141a and 142a (see FIG. 6) after the second coil 222 enters the magnetic field B.

Until the first magnetic regenerator 211 leaves the magnetic field B after the first coil 221 leaves the magnetic field B, the first coil 221 does not contribute to movement of the reciprocation type magnetic regeneration member 200a. As shown in FIGS. 10(e) and 10(f), therefore, the reciprocation type magnetic heat exchanger 100a (see FIG. 6) supplies clockwise driving current to the second coil 222 but does not supply driving current to the first coil 221. As a result, the second coil 222 moves the reciprocation type magnetic regeneration member 200a to the left using attractive force generated between the second coil 222 and the magnetic field generation members 141a and 142a (see FIG. 6) to generate the magnetic field B after the first coil 221 leaves the magnetic field B.

FIGS. 11a-f are views showing current flowing in the coils when the reciprocation type magnetic regeneration member according to the embodiment moves to the right.

Figure 11:
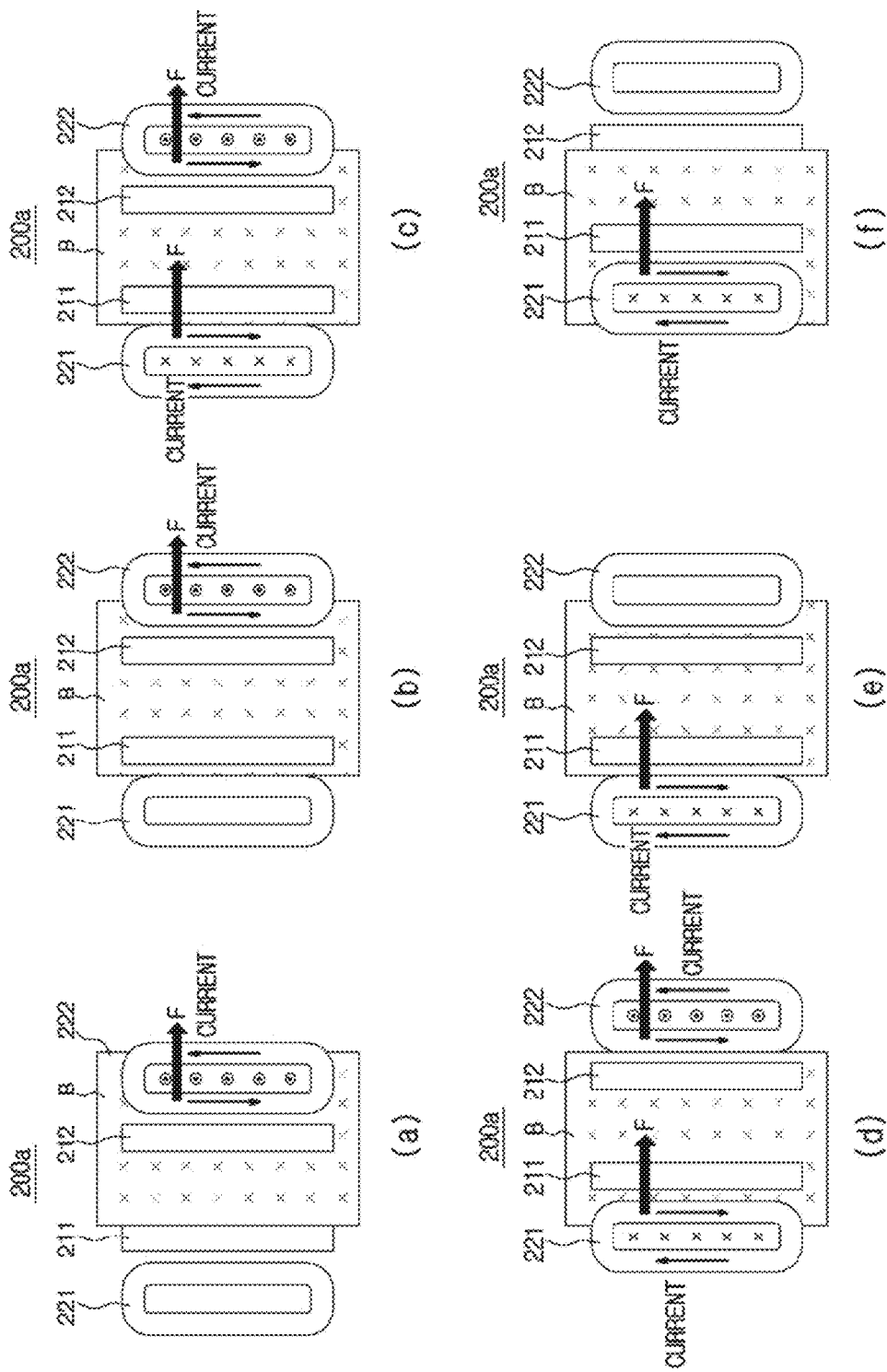
FIGS. 11a-f are views showing current flowing in the coils when the reciprocation type magnetic regeneration member according to the embodiment moves to the right.

Until the first coil 221 enters the magnetic field B from a position where the first magnetic regenerator 211 is located outside the magnetic field B, the first coil 221 does not contribute to movement of the reciprocation type magnetic regeneration member 200a. As shown in FIGS. 11(a) and 11(b), therefore, the reciprocation type magnetic heat exchanger 100a (see FIG. 6) supplies counterclockwise driving current to the second coil 222 but does not supply driving current to the first coil 221. As a result, the first coil 221 moves the reciprocation type magnetic regeneration member 200a to the right using repulsive force generated between the second coil 222 and the magnetic field generation members 141a and 142a (see FIG. 6) to generate the magnetic field B until the first coil 221 enters the magnetic field B.

Until the second coil 222 leaves the magnetic field B after the first coil 221 enters the magnetic field B, driving current is supplied to both the first coil 221 and the second coil 222 as shown in FIGS. 11(c) and 11(d). When entering the magnetic field B, the first coil 221 may contribute to movement of the reciprocation type magnetic regeneration member 200a. Consequently, the reciprocation type magnetic heat exchanger 100a (see FIG. 6) supplies clockwise driving current to the first coil 221 and counterclockwise driving current to the second coil 222. As a result, the first coil 221 and the second coil 222 move the reciprocation type magnetic regeneration member 200a to the right using attractive force generated between the first coil 221 and the magnetic field generation members 141a and 142a (see FIG. 6) and repulsive force generated between the second coil 222 and the magnetic field generation members 141a and 142a (see FIG. 6) after the first coil 221 enters the magnetic field B.

Until the second magnetic regenerator 212 leaves the magnetic field B after the second coil 222 leaves the magnetic field B, the second coil 222 does not contribute to movement of the reciprocation type magnetic regeneration member 200a. As shown in FIGS. 11(e) and 11(f), therefore, the reciprocation type magnetic heat exchanger 100a (see FIG. 6) supplies clockwise driving current to the first coil 221 but does not supply driving current to the second coil 222. As a result, the first coil 221 moves the reciprocation type magnetic regeneration member 200a to the right using attractive force generated between the first coil 221 and the magnetic field generation members 141a and 142a (see FIG. 6) to generate the magnetic field B after the second coil 222 leaves the magnetic field B.

In this way, driving current is not supplied to the coil 221 or 212 which does not contribute to movement of the reciprocation type magnetic regeneration member 200a, thereby achieving efficient use of power.

According to experiments, in a case in which driving current is supplied to the first coil 221 and the second coil 222 having an electrical resistance value of 2.3Ω based on magnetization and demagnetization of the magnetic regenerators 211 and 212 irrespective of position of the coils 221 and 222, average driving current of 1.52 A and average driving current of 1.53 A are supplied to the first coil 221 and the second coil 222, respectively. As a result, the first coil 221 and the second coil 222 consume power of 10.7 W.

On the other hand, in a case in which driving current is not supplied to the first coil 221 or the second coil 222 which does not contribute to movement of the magnetic regeneration member 200a depending upon position of the coils 221 and 222, average driving current of 1.19 A and average driving current of 1.13 A are supplied to the first coil 221 and the second coil 222, respectively. As a result, the first coil 221 and the second coil 222 consume power of 6.19 W.

In conclusion, in a case in which driving current is not supplied to the first coil 221 or the second coil 222 which does not contribute to movement of the magnetic regeneration member 200a depending upon position of the coils 221 and 222, driving current is decreased by 21.7% and power consumption is decreased by 42% on average.

Figure 12:
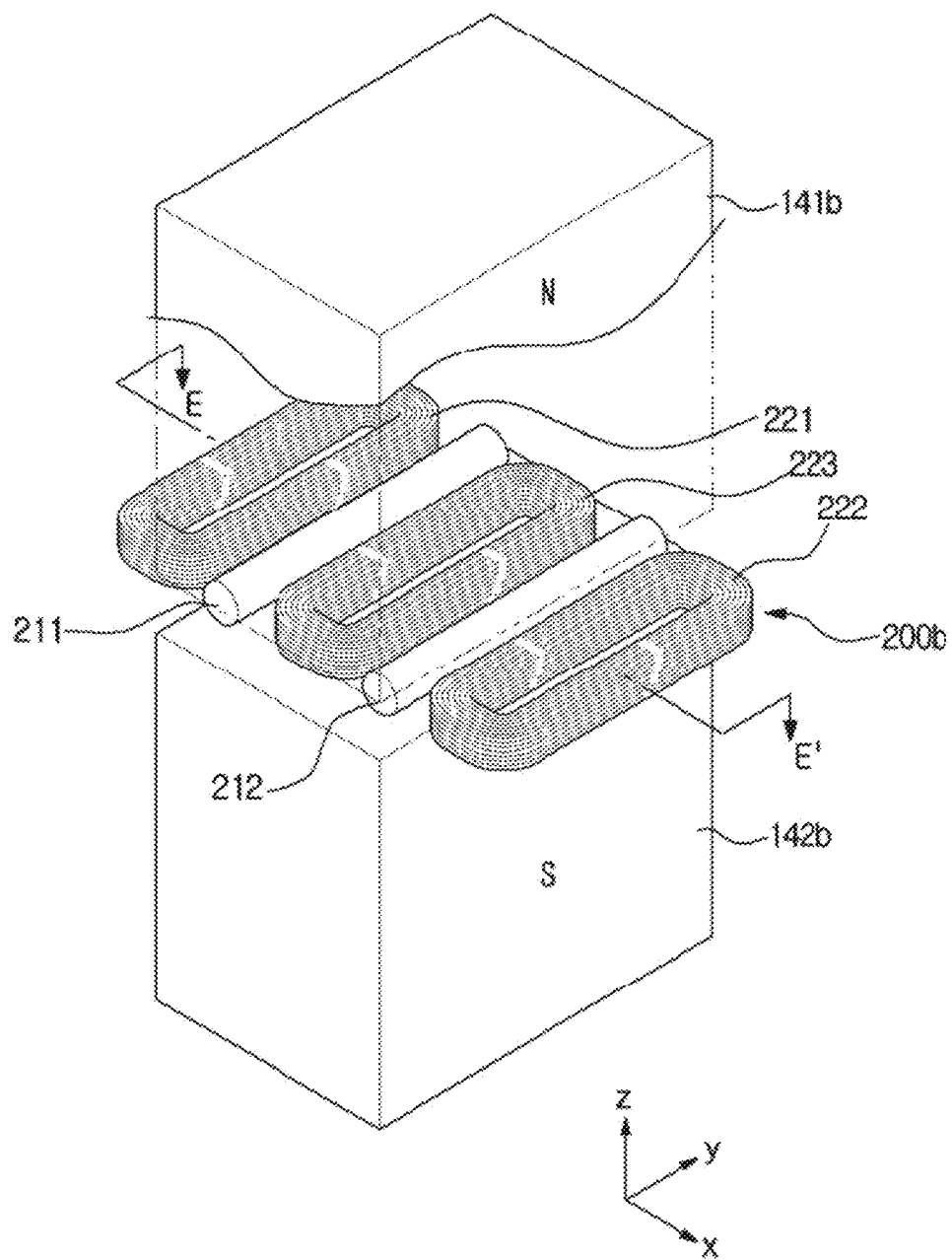
FIG. 12 is a view showing a reciprocation type magnetic heat exchanger according to another embodiment.
Figure 13:
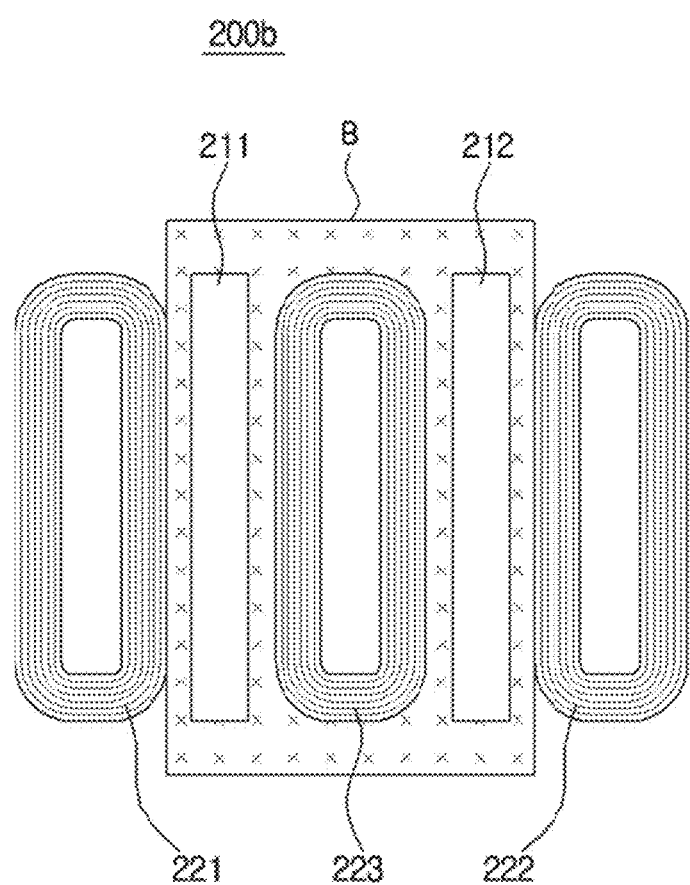
FIG. 13 is a view taken along line E-E' of FIG. 12.

FIG. 12 is a view showing a reciprocation type magnetic heat exchanger according to another embodiment and FIG. 13 is a view taken along line E-E' of FIG. 12.

Referring to FIGS. 12 and 13, a reciprocation type magnetic heat exchanger 100b includes a reciprocation type magnetic regeneration member 200b and magnetic field generation members 141b and 142b to generate a magnetic field B perpendicular to the reciprocation type magnetic regeneration member 200b.

The magnetic field generation members 141b and 142b include a first permanent magnet and a second permanent magnet disposed in parallel. The first permanent magnet and the second permanent magnet are disposed such that different polarities are opposite to each other in a state in which the reciprocation type magnetic regeneration member 200b is disposed therebetween.

The reciprocation type magnetic regeneration member 200b includes a first magnetic regenerator 211 and a second magnetic regenerator 212 provided in parallel in a direction perpendicular to the magnetic field B, a first coil 221 and a second coil 222 provided outside the first magnetic regenerator 211 and the second magnetic regenerator 212, and a third coil 223 provided between the first magnetic regenerator 211 and the second magnetic regenerator 212.

In the reciprocation type magnetic regeneration member 200b, the first magnetic regenerator 211, the second magnetic regenerator 212, the first coil 221, the second coil 222, and the third coil 223 are integrated to reciprocate in a direction perpendicular to the magnetic field B generated by the magnetic field generation members 141b and 142b.

FIGS. 14a and b are views illustrating reciprocation of a reciprocation type magnetic regeneration member according to another embodiment.

In a case in which the reciprocation type magnetic regeneration member 200b moves from the left to the right on the basis of the center of the magnetic field B as shown in FIG. 14(a), the reciprocation type magnetic heat exchanger 100b does not supply driving current to the first coil 221 located outside the magnetic field B, supplies counterclockwise driving current to the second coil 222, and supplies clockwise driving current to the third coil 223. The first coil 221 located outside the magnetic field B does not contribute to movement of the reciprocation type magnetic regeneration member 200b. Consequently, the reciprocation type magnetic heat exchanger 100b does not supply driving current to the first coil 221. In addition, the reciprocation type magnetic regeneration member 200b may move to the right using repulsive force generated between the second coil 222, to which counterclockwise driving current is supplied, and the magnetic field generation members 141b and 142b (see FIG. 12) to generate the magnetic field B and attractive force generated between the third coil 223, to which clockwise driving current is supplied, and the magnetic field generation members 141b and 142b (see FIG. 12).

In a case in which the reciprocation type magnetic regeneration member 200b moves from the right to the left on the basis of the center of the magnetic field B as shown in FIG. 14(b), the reciprocation type magnetic heat exchanger 100b does not supply driving current to the second coil 222 located outside the magnetic field B, supplies counterclockwise driving current to the first coil 221, and supplies clockwise driving current to the third coil 223. The second coil 222 located outside the magnetic field B does not contribute to movement of the reciprocation type magnetic regeneration member 200b. Consequently, the reciprocation type magnetic heat exchanger 100b does not supply driving current to the second coil 222. In addition, the reciprocation type magnetic regeneration member 200b may move to the left using repulsive force generated between the first coil 221, to which counterclockwise driving current is supplied, and the magnetic field generation members 141b and 142b (see FIG. 12) to generate the magnetic field B and attractive force generated between the third coil 223, to which clockwise driving current is supplied, and the magnetic field generation members 141b and 142b (see FIG. 12).

Hereinbefore, the reciprocation type magnetic regeneration member reciprocating in the magnetic field and the reciprocation type magnetic heat exchanger including the reciprocation type magnetic regeneration member were described.

Hereinafter, a rotation type magnetic regeneration member rotating about a shaft and a rotation type magnetic heat exchanger including the rotation type magnetic regeneration member will be described.

Figure 15:
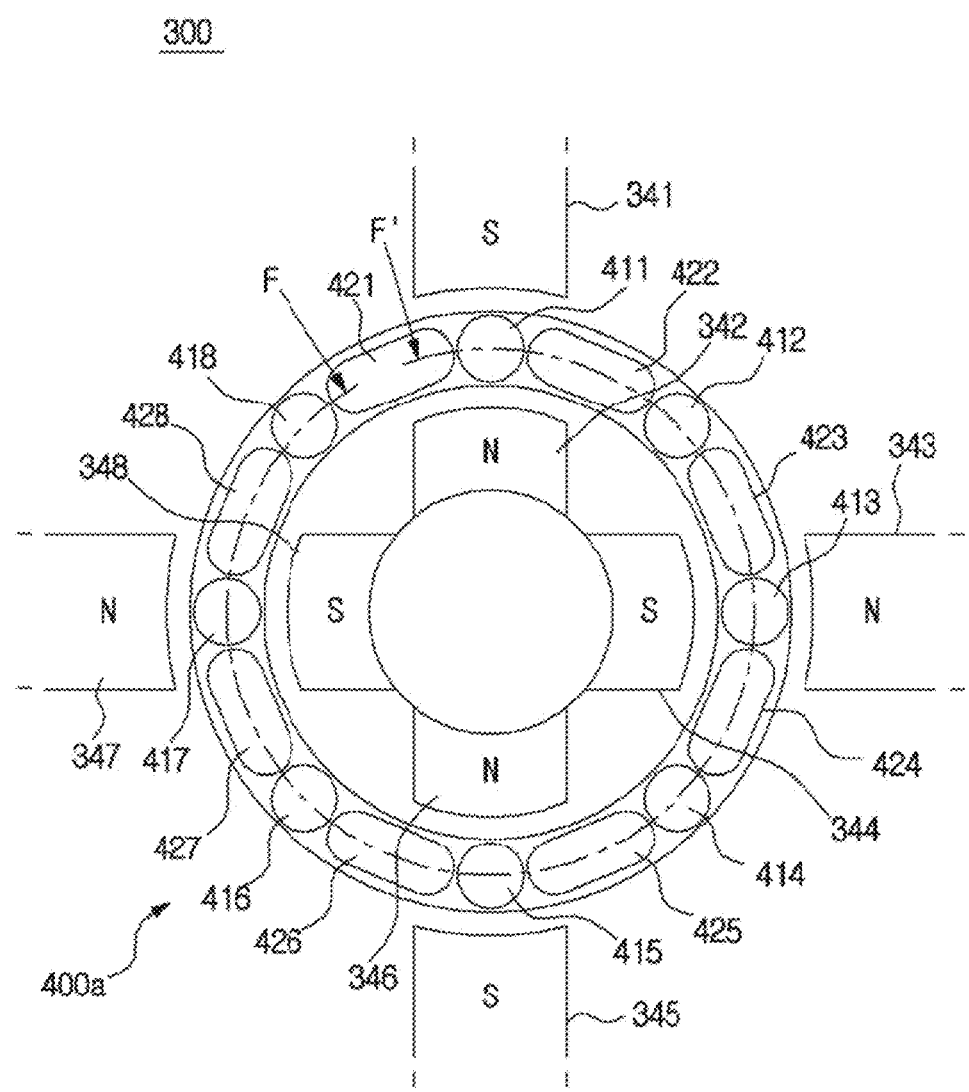
FIG. 15 is a view showing a rotation type magnetic heat exchanger according to an embodiment.

FIG. 15 is a view showing a rotation type magnetic heat exchanger according to an embodiment and FIGS. 16a and b are views showing intensity of a magnetic field on line F-F' of FIG. 15 and a sectional view of a magnetic regeneration member taken along line F-F' of FIG. 15.

Figure 16:
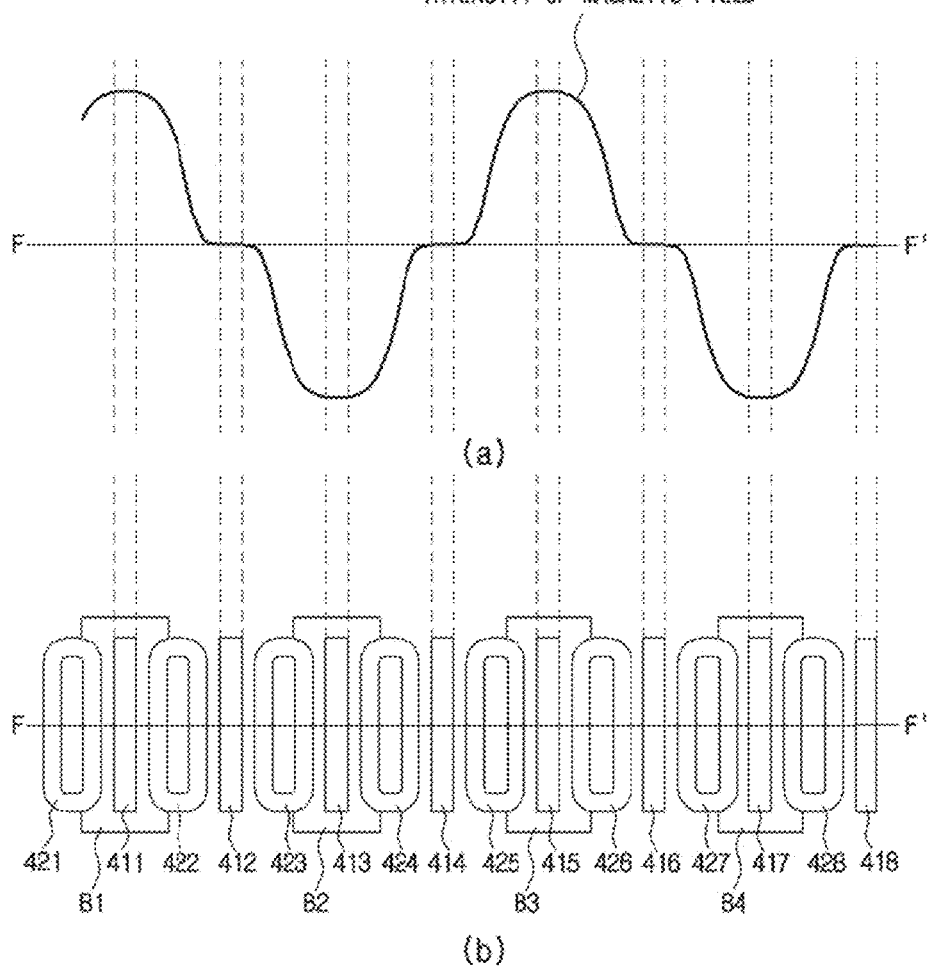
FIGS. 16a and b are views showing intensity of a magnetic field on line F-F' of FIG. 15 and a sectional view of a magnetic regeneration member taken along line F-F' of FIG. 15.

Referring to FIGS. 15 and 16, a rotation type magnetic heat exchanger 300 includes a cylindrical rotation type magnetic regeneration member 400, magnetic field generation members 341 to 348 to generate a magnetic field perpendicular to the rotation type magnetic regeneration member 400, and a rotation type channel switching member (not shown) to switch a channel of a heat transfer material.

The magnetic field generation members 341 to 348 include four pairs of permanent magnets 341 and 342, 343 and 344, 345 and 346, and 347 and 348 disposed such that different polarities are opposite to each other in a state in which the rotation type magnetic regeneration member 400 is disposed therebetween.

The rotation type magnetic regeneration member 400 includes a first magnetic regenerator 411, a second magnetic regenerator 412, a third magnetic regenerator 413, a fourth magnetic regenerator 414, a fifth magnetic regenerator 415, a sixth magnetic regenerator 416, a seventh magnetic regenerator 417, and an eighth magnetic regenerator 418 arranged along a circumference of a circle having a predetermined radius at regular intervals.

Coils 421 to 428 are provided between the respective magnetic regenerators 411 to 418. Specifically, a first coil 421 is provided between the eighth magnetic regenerator 418 and the first magnetic regenerator 411, a second coil 422 is provided between the first magnetic regenerator 411 and the second magnetic regenerator 412, and a third coil 423 is provided between the second magnetic regenerator 412 and the third magnetic regenerator 413. In the same manner, a fourth coil 424, a fifth coil 425, a sixth coil 426, a seventh coil 427, and an eighth coil 428 are respectively provided between the respective magnetic regenerators 411 to 418.

In other words, as shown in FIG. 16, the eight magnetic regenerators 411 to 418 and the eight coils 421 to 428 are alternately arranged on the circumference of the circle.

The four pairs of permanent magnets 341 to 348 include first and second permanent magnets 341 and 342 to generate a first magnetic field B1 with respect to the rotation type magnetic regeneration member 400 in an outer radial direction, third and fourth permanent magnets 343 and 344 to generate a second magnetic field B2 with respect to the rotation type magnetic regeneration member 400 in an inner radial direction, fifth and sixth permanent magnets 345 and 346 to generate a third magnetic field B3 with respect to the rotation type magnetic regeneration member 400 in the outer radial direction, and seventh and eighth permanent magnets 347 and 348 to generate a fourth magnetic field B4 with respect to the rotation type magnetic regeneration member 400 in the inner radial direction.

The four pairs of permanent magnets 341 and 342, 343 and 344, 345 and 346, and 347 and 348 are disposed such that neighboring permanent magnets generate magnetic fields having opposite directions. Specifically, the first permanent magnet 341, provided outside the circumference at which the rotation type magnetic regeneration member 400 is provided, is disposed such that an S pole of the first permanent magnet 341 faces the circumference and the second permanent magnet 342, provided inside the circumference, is disposed such that an N pole of the second permanent magnet 342 faces the circumference. In addition, the third permanent magnet 343, provided outside the circumference at which the rotation type magnetic regeneration member 400 is provided, is disposed such that an N pole of the third permanent magnet 343 faces the circumference and the fourth permanent magnet 344, provided inside the circumference, is disposed such that an S pole of the fourth permanent magnet 344 faces the circumference. In addition, the fifth permanent magnet 345, provided outside the circumference at which the rotation type magnetic regeneration member 400 is provided, is disposed such that an S pole of the fifth permanent magnet 345 faces the circumference and the sixth permanent magnet 346, provided inside the circumference, is disposed such that an N pole of the sixth permanent magnet 346 faces the circumference. In addition, the seventh permanent magnet 347, provided outside the circumference at which the rotation type magnetic regeneration member 400 is provided, is disposed such that an N pole of the seventh permanent magnet 347 faces the circumference and the eighth permanent magnet 348, provided inside the circumference, is disposed such that an S pole of the eighth permanent magnet 348 faces the circumference.

As a result, intensity of the magnetic field is periodically varied as shown in FIG. 16(*a*).

FIGS. 17*a-d* and 18*a-d* are views illustrating clockwise rotation of a rotation type magnetic regeneration member according to an embodiment. Specifically, FIGS. 17*a-d* show current supplied to the coils 421 to 428 of the magnetic regeneration member 400 on the basis of FIG. 15 and FIGS. 18*a-d* show current supplied to the coils 421 to 428 of the magnetic regeneration member 400 on the basis of a section taken along line F-F' of FIG. 15.

Figure 17:
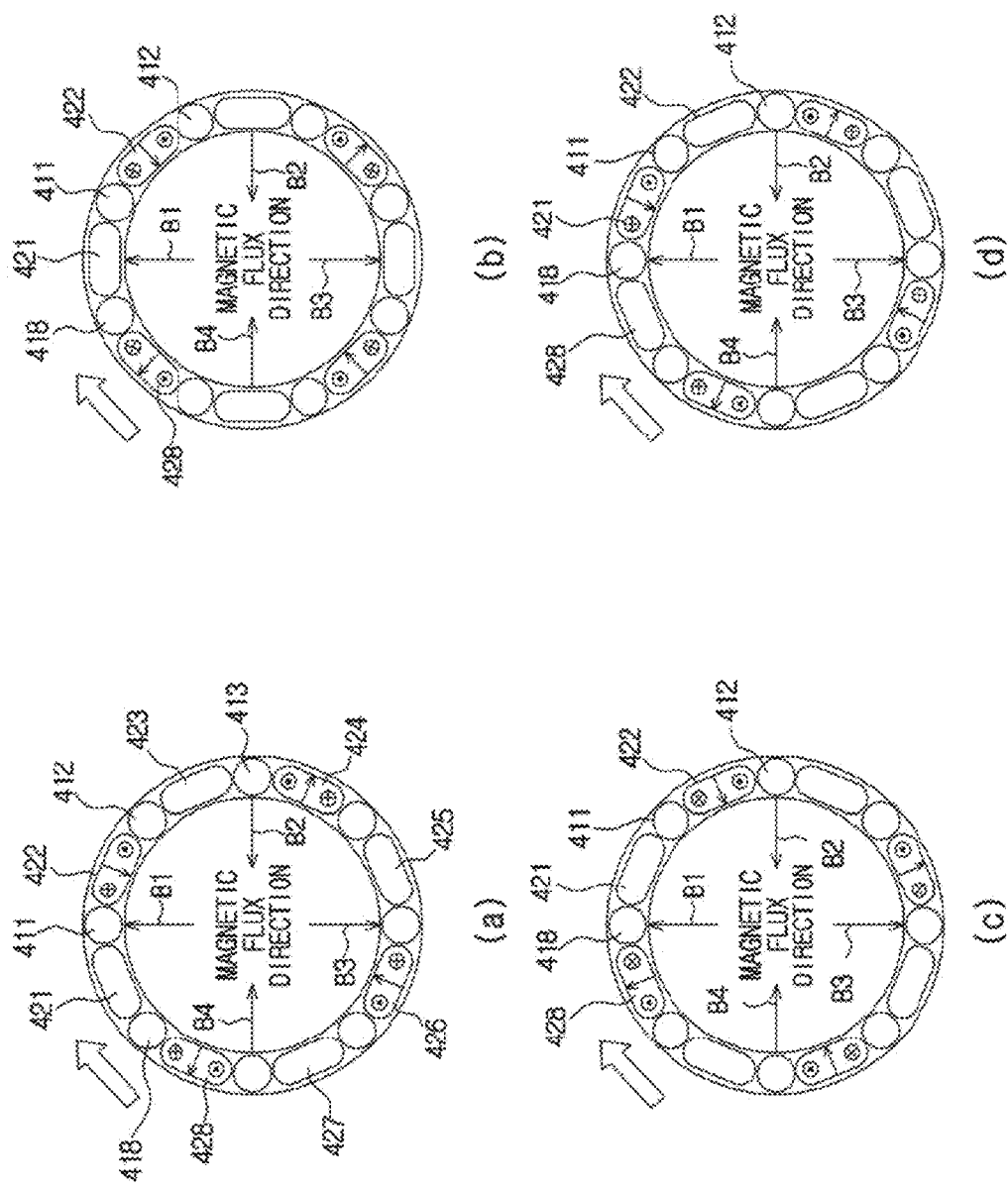
FIGS. 17a-d and 18a-d are views illustrating clockwise rotation of a rotation type magnetic regeneration member according to an embodiment.

Referring first to FIGS. 17(*a*) and 18(*a*), driving current is supplied to the second coil 422 located with respect to the first magnetic regenerator 411 located in the first magnetic field B1 in a clockwise direction such that the second coil 422 generates a magnetic field having an opposite direction to the first magnetic field B1. In addition, counterclockwise driving current is supplied to the fourth coil 424 located with respect to the third magnetic regenerator 413 located in the second magnetic field B2 in a clockwise direction such that the fourth coil 424 generates a magnetic field having an opposite direction to the second magnetic field B2. In the same manner, driving current is supplied to the sixth coil 426 and the eighth coil 428 such that the sixth coil 426 and the eighth coil 428 generate magnetic fields having opposite directions to adjacent magnetic fields B3 and B4. In other words, driving current is supplied to the coils 422, 424, 426, and 428 located with respect to the magnetic fields B1 to B4 in directions to be rotated such that the coils 422, 424, 426, and 428 generate magnetic fields having opposite directions to the magnetic fields B1 to B4.

Figure 18:
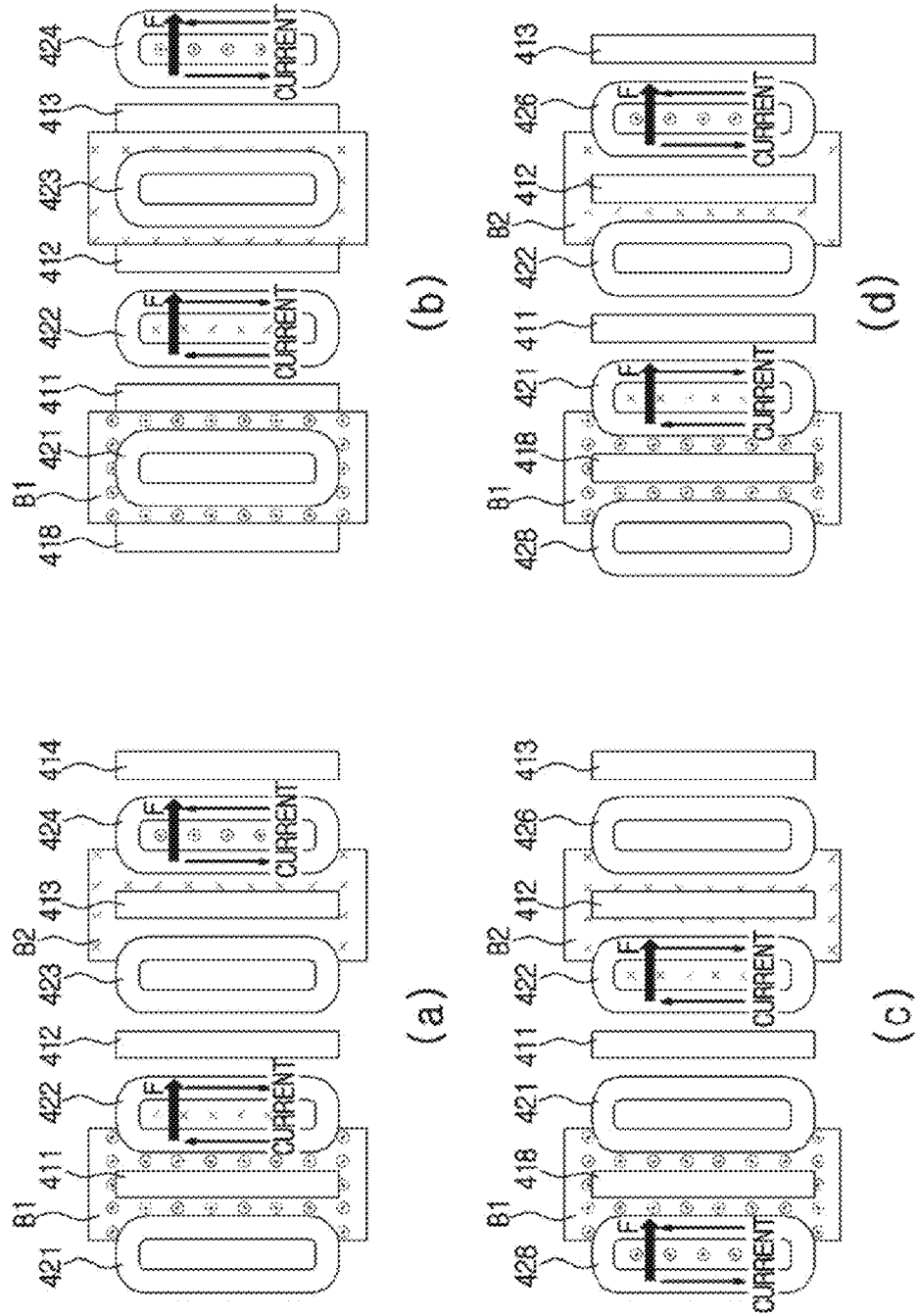

When driving current is supplied to the second, fourth, sixth, and eighth coils 422, 424, 426, and 428 as described above, the rotation type magnetic regeneration member 400 rotates in a clockwise direction in FIG. 18(*a*) due to repulsive force between the second, fourth, sixth, and eighth coils 422, 424, 426, and 428 and the four pairs of permanent magnets 341 to 348.

In FIG. 18(*a*), when clockwise driving current is supplied to the second coil 422 located with respect to the first magnetic field B1 in a right direction (in a clockwise direction), a magnetic field having an opposite direction to the first magnetic field B1 is generated in the second coil 422 and repulsive force is generated between the second coil 422 and the first and second permanent magnets 341 and 342 to generate the first magnetic field B1. As a result, the magnetic regeneration member 400 may move (rotate) in the left direction (the clockwise direction).

As rotating in the clockwise direction from the position shown in FIGS. 17(*a*) and 18(*a*), the rotation type magnetic regeneration member 400 reaches a position shown in FIGS. 17(*b*) and 18(*b*).

Referring to FIGS. 17(*b*) and 18(*b*), the distance between the second, fourth, sixth, and eighth coils 422, 424, 426, and 428 and the magnetic fields B1 to B4 having opposite directions to the magnetic fields generated by the coils 422, 424, 426, and 428 is increased with the result that repulsive force generated therebetween is decreased. At the same time, the distance between the second, fourth, sixth, and eighth coils 422, 424, 426, and 428 and the magnetic fields B1 to B4 having the same directions as the magnetic fields generated by the coils 422, 424, 426, and 428 is decreased with the result that attractive force generated therebetween is increased. For example, in FIG. 18(*b*), the second coil 422 becomes far from the first magnetic field B1 but becomes near the second magnetic field B2 with the result that attractive force between the third and fourth permanent magnets 343 and 344 to generate the second magnetic field B2 and the second coil 422 is increased. Consequently, the rotation type magnetic regeneration member 400 may continue to rotate.

As rotating in the clockwise direction from the position shown in FIGS. 17(*b*) and 18(*b*), the rotation type magnetic regeneration member 400 reaches a position shown in FIGS. 17(*c*) and 18(*c*).

Referring to FIGS. 17(*c*) and 18(*c*), the second, fourth, sixth, and eighth coils 422, 424, 426, and 428, to which driving current is supplied, enter the magnetic fields B1 to B4 having the same directions as the magnetic fields generated by the coils 422, 424, 426, and 428. For example, the second coil 422 enters the second magnetic field B2 as shown in FIG. 18(*c*).

When the second, fourth, sixth, and eighth coils 422, 424, 426, and 428 enter the magnetic fields B1 to B4, interaction between the coils 422, 424, 426, and 428 and the four pairs of permanent magnets 341 to 348 is increased but rotational force of the magnetic regeneration member 400 is decreased. For example, if driving current is continuously supplied to the second coil 422 even after the second coil 422 enters the second magnetic field B2 as shown in FIG. 18(*c*), attractive force generated between the second coil 422 and the third and fourth permanent magnets 343 and 344 to generate the second magnetic field B2 restrains movement of the second coil 422 when the second coil 422 leaves the second magnetic field B2. As a result, rotational force of the rotation type magnetic regeneration member 400 is decreased.

In order to prevent this phenomenon, the supply of driving current to the second, fourth, sixth, and eighth coils 422, 424, 426, and 428 is interrupted and driving current is supplied to the first, third, fifth, and seventh coils 412, 423, 425, and 427 when the rotation type magnetic regeneration member 400 is located at the position shown in FIGS. 17(*c*) and 18(*c*). In other words, when the coils to which driving current is supplied enter the magnetic fields, the supply of driving current to the coils is interrupted and driving current is supplied to the other coils.

At this time, driving current is supplied to the first, third, fifth, and seventh coils 412, 423, 425, and 427 such that the first, third, fifth, and seventh coils 412, 423, 425, and 427 generate magnetic fields having opposite directions to the magnetic fields B1 to B4 adjacent thereto. For example, as shown in FIG. 18(*d*), clockwise driving current is supplied to the first coil 421 leaving the first magnetic field B1. As a result, a magnetic field having an opposite direction to the first magnetic field B1 is generated in the first coil 421 and repulsive force is generated between the first and second permanent magnets 341 and 342 to generate the first magnetic field B1 and the first coil 421. Consequently, the rotation type magnetic regeneration member 400 may rotate in the clockwise direction.

In brief, the rotation type magnetic regeneration member 400 supplies driving current to the coils 421 to 428 leaving the magnetic fields B1 to B4 and interrupts the supply of driving current to the coils 421 to 428 entering the magnetic fields B1 to B4 such that rotational force of the rotation type magnetic regeneration member 400 is maintained in one direction.

Hereinbefore, one-way direction of the rotation type magnetic regeneration member was described. However, embodiments of the present invention are not limited thereto. For example, the rotation type magnetic regeneration member may reciprocatively rotate in opposite directions. That is, the rotation type magnetic regeneration member may rotate in a clockwise direction by a predetermined angle and then rotate in a counterclockwise direction by the same angle, which may be repeated such that the rotation type magnetic regeneration member reciprocatively rotates.

Hereinafter, reciprocating rotation of the rotation type magnetic regeneration member shown in FIGS. 15 and 16 will be described.

FIGS. 19*a*-*f* to 20*a*-*c* are views illustrating reciprocating rotation of the rotation type magnetic regeneration member according to the embodiment.

Figure 19:
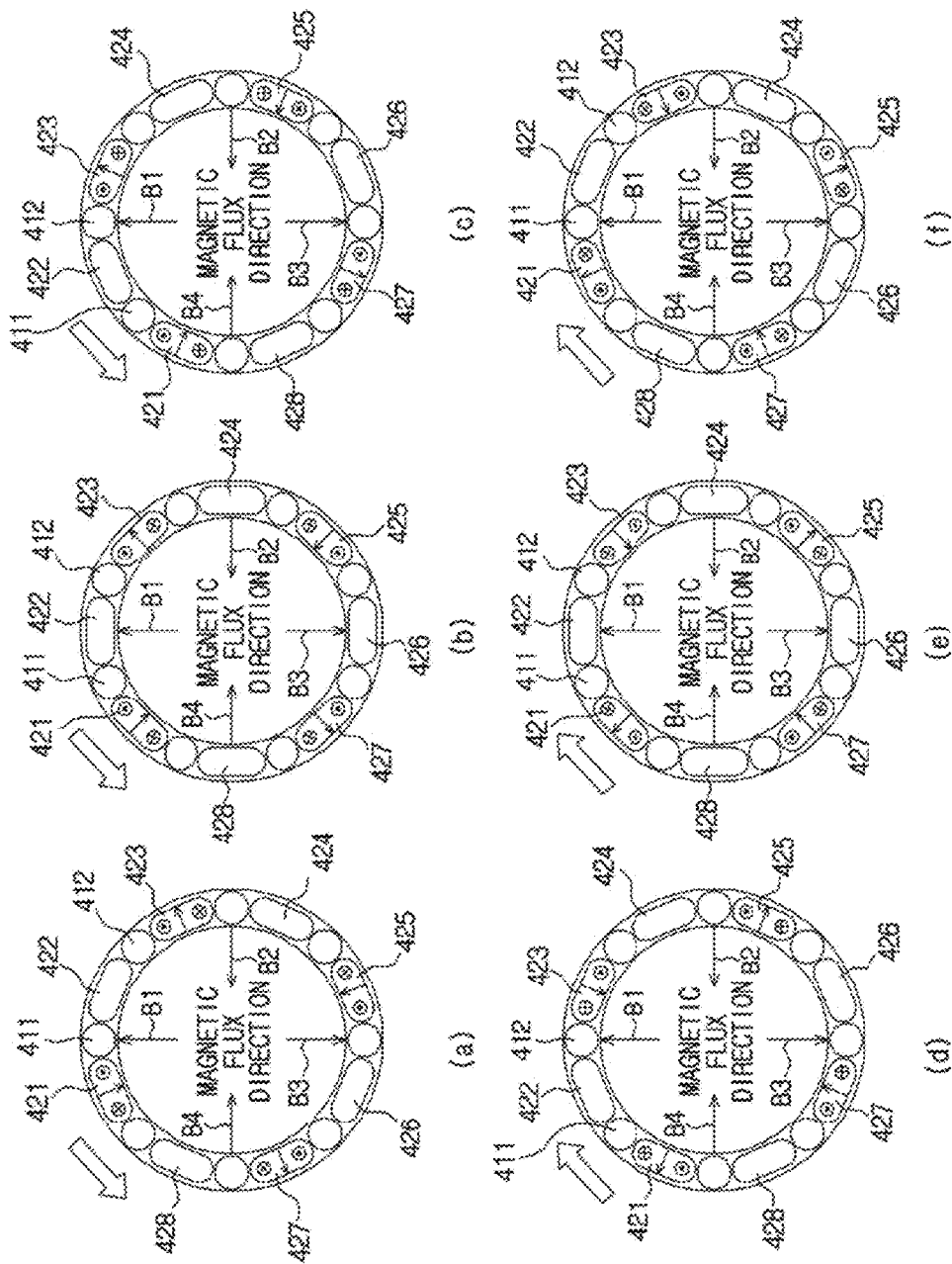

In order to rotate the rotation type magnetic regeneration member 400 in a counterclockwise direction, as shown in FIG. 19(*a*), driving current is supplied to the first, third, fifth, and seventh coils 421, 423, 425, and 427 located with the magnetic fields B1 to B4 in the counterclockwise direction. At this time, driving current is supplied to the first, third, fifth, and seventh coils 421, 423, 425, and 427 such that magnetic fields having opposite directions to the magnetic fields B1 to B4 generated by the four pairs of permanent magnets 341 to 348 are generated in the first, third, fifth, and seventh coils 421, 423, 425, and 427.

For example, when clockwise driving current is supplied to the first coil 421 as shown in FIG. 20A(*a*), a magnetic field having an opposite direction to the first magnetic field B1 is generated in the first coil 421 and repulsive force is generated between the first coil 421 and the magnetic field generation members 341 and 342 to generate the first magnetic field B1. In this way, when driving current is supplied to the first, third, fifth, and seventh coils 421, 423, 425, and 427 such that magnetic fields having opposite directions to the first, second, third, and fourth magnetic fields B1, B2, B3, and B4 are generated in the first, third, fifth, and seventh coils 421, 423, 425, and 427, the rotation type magnetic regeneration member 400 may rotated in the counterclockwise direction due to repulsive force generated between the first, third, fifth, and seventh coils 421, 423, 425, and 427 and the four pairs of permanent magnets 341 to 348.

As rotating in the counterclockwise direction from the position shown in FIGS. 19(*a*) and 20(*a*), the rotation type magnetic regeneration member 400 reaches a position shown in FIGS. 19(*b*) and 20(*b*).

Referring to FIGS. 19(*b*) and 20(*b*), the distance between the first, third, fifth, and seventh coils 421, 423, 425, and 427, to which driving current is supplied, and the magnetic fields B1 to B4 having opposite directions to the magnetic fields generated by the coils 421, 423, 425, and 427 is increased with the result that repulsive force generated therebetween is decreased. At the same time, the distance between the first, third, fifth, and seventh coils 421, 423, 425, and 427 and the magnetic fields B1 to B4 having the same directions as the magnetic fields generated by the 421, 423, 425, and 427 is decreased with the result that attractive force generated therebetween is increased. For example, in FIG. 20(*b*), the third coil 423 becomes far from the second magnetic field B2 but becomes near the first magnetic field B1 having the same direction as the magnetic field generated by the third coil 423 with the result that attractive force between the first and second permanent magnets 341 and 342 to generate the first magnetic field B1 and the third coil 423 is increased. Consequently, the rotation type magnetic regeneration member 400 may continue to rotate.

As rotating in the clockwise direction from the position shown in FIGS. 19(*b*) and 20(*b*), the rotation type magnetic regeneration member 400 reaches a position shown in FIGS. 19(*c*) and 20(*c*).

Referring to FIGS. 19(*c*) and 20(*c*), the first, third, fifth, and seventh coils 421, 423, 425, and 427, to which driving current is supplied, enter the magnetic fields B1 to B4 having the same directions as the magnetic fields generated by the coils 421, 423, 425, and 427. For example, the third coil 423 enters the first magnetic field B1 as shown in FIG. 20(*c*).

In this way, when the first, third, fifth, and seventh coils 421, 423, 425, and 427 enter the magnetic fields B1 to B4 having the same directions as the magnetic fields generated by the coils 421, 423, 425, and 427, the rotation type magnetic heat exchanger 300 changes the direction of current supplied to the first, third, fifth, and seventh coils 421, 423, 425, and 427 as shown in FIGS. 19(*d*) and 21(*a*) such that the rotation type magnetic regeneration member 400 reciprocatively rotates. For example, when counterclockwise driving current is supplied to the third coil 423 as shown in FIG. 20(*c*), attractive force is generated between the third coil 423 and the first and second permanent magnets 341 and 342 to generate the first magnetic field B1. At this time, when the rotation type magnetic heat exchanger 300 supplies clockwise driving current to the third coil 423 as shown in FIG. 21(*a*), repulsive force is generated between the third coil 423 and the magnetic field generation members 341 and 342 to generate the first magnetic field B1. As a result, the rotation type magnetic regeneration member 400 rotates in a right direction, i.e. in a clockwise direction.

As rotating in the clockwise direction from the position shown in FIGS. 19(*d*) and 21(*a*), the rotation type magnetic regeneration member 400 reaches a position shown in FIGS. 19(*e*) and 21(*b*). Subsequently, the rotation type magnetic regeneration member 400 may continue to rotate in the clockwise direction due to attractive force generated between the first, third, fifth, and seventh coils 421, 423, 425, and 427, to which driving current is supplied, and the magnetic fields B1 to B4 having the same directions as the magnetic fields generated by the 421, 423, 425, and 427.

As rotating in the clockwise direction from the position shown in FIGS. 19(*e*) and 21(*b*), the rotation type magnetic regeneration member 400 reaches a position shown in FIGS. 19(*f*) and 21(*c*).

Referring to FIGS. 19(*f*) and 21(*c*), the first, third, fifth, and seventh coils 421, 423, 425, and 427, to which driving current is supplied, enter the magnetic fields B1 to B4 having the same directions as the magnetic fields generated by the coils 421, 423, 425, and 427. For example, the third coil 423 enters the second magnetic field B2 as shown in FIG. 21(*c*).

In this way, when the first, third, fifth, and seventh coils 421, 423, 425, and 427 enter the magnetic fields B1 to B4 having the same directions as the magnetic fields generated by the coils 421, 423, 425, and 427, the rotation type magnetic heat exchanger 300 changes the direction of current supplied to the first, third, fifth, and seventh coils 421, 423, 425, and 427 as shown in FIGS. 19(*a*) and 20(*a*) such that the rotation type magnetic regeneration member 400 reciprocatively rotates. For example, when clockwise driving current is supplied to the third coil 423 as shown in FIG. 21(*c*), attractive force is generated between the third coil 423 and the magnetic field generation members 343 and 344 to generate the second magnetic field B2. At this time, when the rotation type magnetic heat exchanger 300 supplies clockwise driving current to the third coil 423 as shown in FIG. 20(*a*), repulsive force is generated between the third coil 423 and the third and fourth permanent magnets 343 and 344 to generate the second magnetic field B2. As a result, the rotation type magnetic regeneration member 400 rotates in a left direction, i.e. in a counterclockwise direction.

In this way, the rotation type magnetic heat exchanger 300 periodically changes the direction of current supplied to the coils 421 to 428 such that the rotation type magnetic regeneration member 400 reciprocatively rotates. Specifically, when the coils to which driving current is supplied enters the magnetic fields generated by the magnetic field generation members, the rotation type magnetic heat exchanger 300 changes the direction of the driving current such that magnetic fields having opposite directions to the magnetic fields generated by the magnetic field generation members are generated in the coils and thus the coils become far from the magnetic fields.

Figure 22:
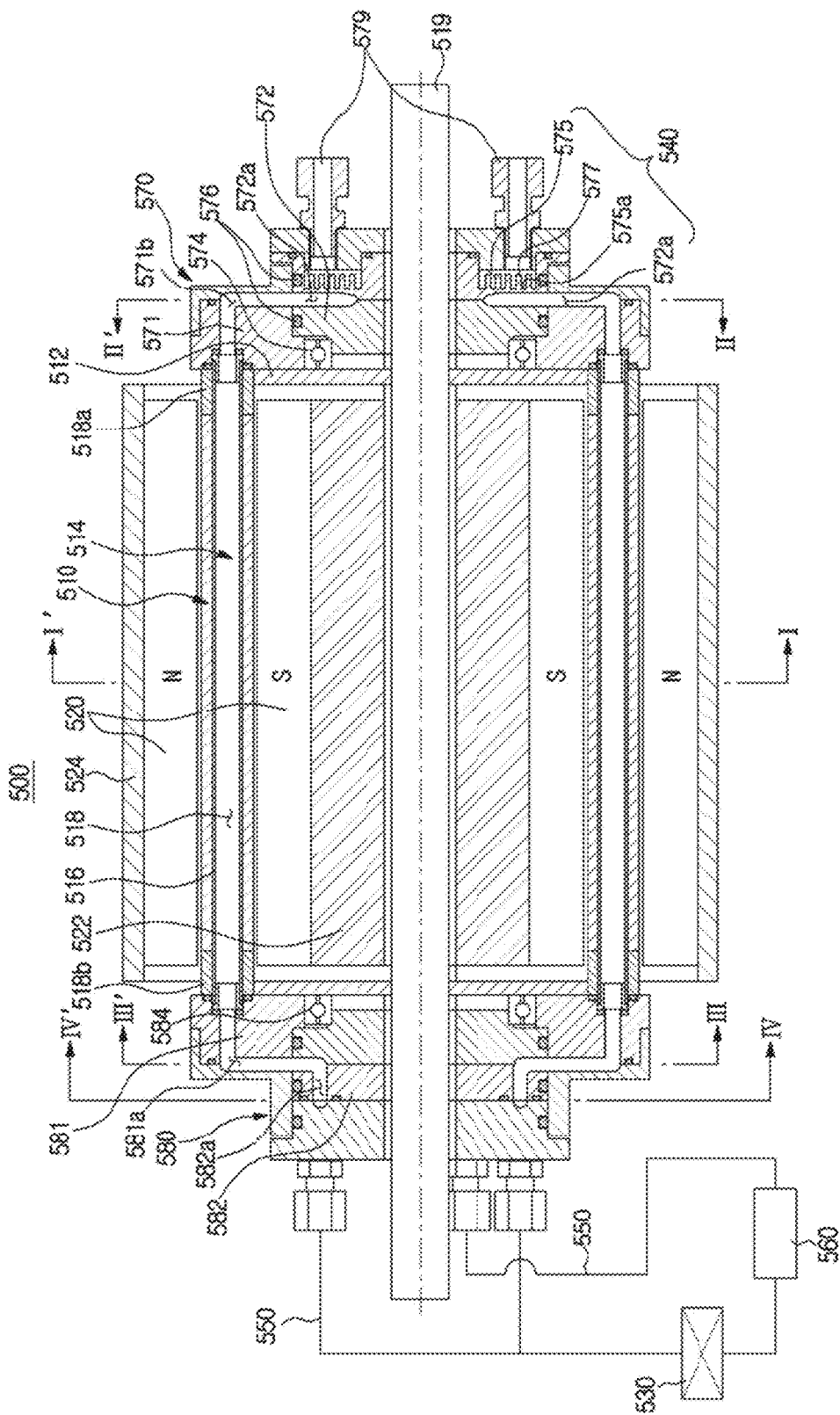
FIG. 22 is a view showing a magnetic cooling apparatus according to another embodiment.
Figure 23:
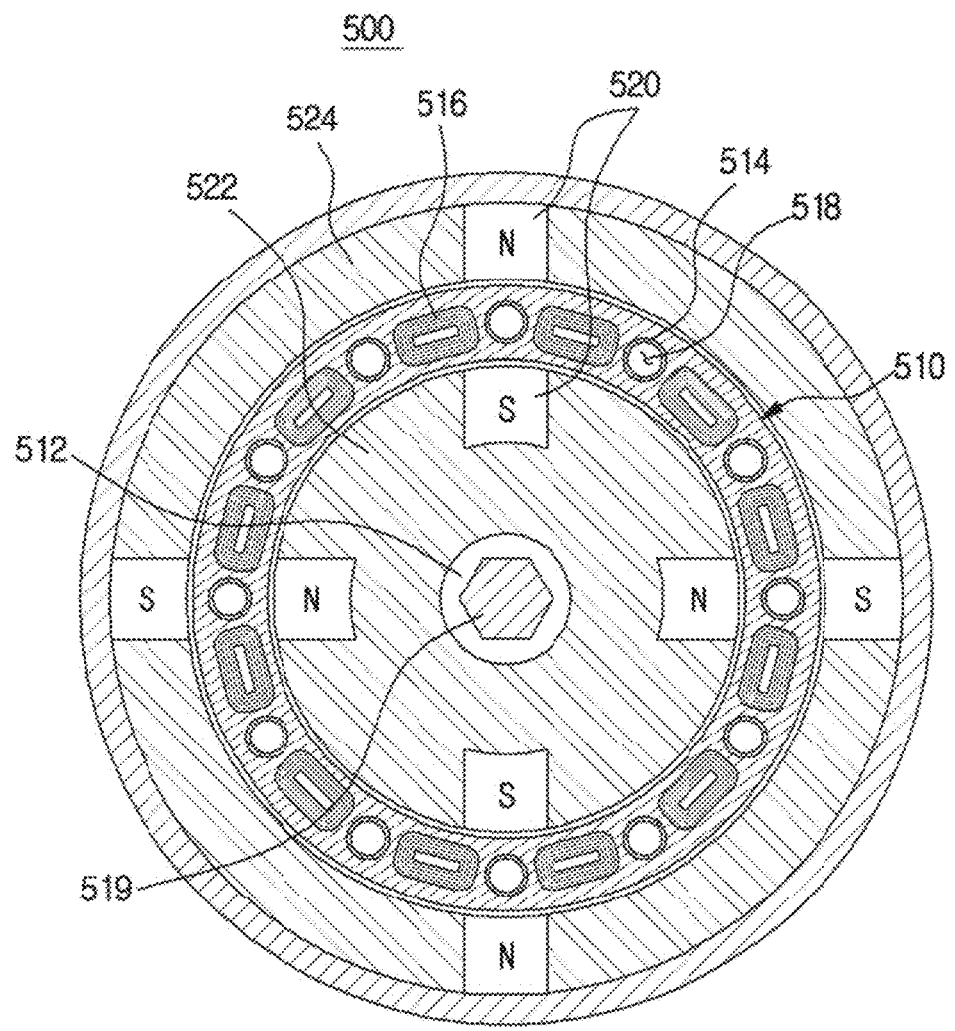
FIG. 23 is a view taken along line I-I' of FIG. 22.

FIG. 22 is a view showing a magnetic cooling apparatus according to another embodiment and FIG. 23 is a view taken along line I-I' of FIG. 21.

As shown in FIGS. 22 and 23, a magnetic cooling apparatus 500 includes a magnetic regeneration member 510 including a plurality of magnetic regenerators 514 and a plurality of coils 516, a permanent magnet 520 to apply a magnetic field to the magnetic regenerators 514 or to remove the magnetic field from the magnetic regenerators 514, a high-temperature side heat exchanger 530 to which a heat transfer fluid, receiving heat from the magnetic regenerators 514 to which the magnetic field is applied by the permanent magnet 520, emits heat, a low-temperature side heat exchanger 540 from which the heat transfer fluid, transferring heat to the magnetic regenerators 514 from which the magnetic field is removed by the permanent magnet 520, absorbs heat, a transfer pipe 550 connected among the magnetic regenerators 514, the high-temperature side heat exchanger 530, and the low-temperature side heat exchanger 540 to reciprocate or circulate the heat transfer fluid along the magnetic regenerators 514, the high-temperature side heat exchanger 530, and the low-temperature side heat exchanger 540, and a pump 560 to circulate the heat transfer fluid along the transfer pipe 550.

Water, alcohol, an antifreeze solution such as ethylene glycol, helium gas, or a mixture thereof may be used as the heat transfer fluid used in the magnetic cooling apparatus 500.

The permanent magnet 520 includes at least one pair of N and S poles. The permanent magnet 520 is radially disposed inside and outside the magnetic regeneration member 510 to apply a magnetic field to the magnetic regeneration member 510 or to remove the magnetic field from the magnetic regeneration member 510. The N and S poles may be alternately arranged in a circumferential direction of the magnetic regeneration member 510. The permanent magnet 520 is supported by a first permanent magnet support part 522 and a second permanent magnet support part 524 respectively provided inside and outside the magnetic regeneration member 510.

The magnetic regeneration member 510 includes a cylindrical housing 512, the plurality of magnetic regenerators 514 and the plurality of coils 516 radially arranged in the housing 512 at intervals in a circumferential direction of the housing 512, and a shaft 519 coupled to the center of the housing 512 to rotate the housing 512.

A through hole 518, through which the heat transfer fluid passes, is formed in each magnetic regenerator 514. Connectors 518*a* and 518*b*, which are respectively connected to a first channel switching valve 570 and a second channel switching valve 580, are provided at opposite ends of the through hole 518. Each magnetic regenerator 514 is connected to the low-temperature side heat exchanger 540 and the high-temperature side heat exchanger 530 through the first channel switching valve 570 and the second channel switching valve 580 by the provision of the connectors 518*a* and 518*b* such that the heat transfer fluid, having passed through each magnetic regenerator 514, flows to the low-temperature side heat exchanger 540 and the high-temperature side heat exchanger 530.

The coils 516 are disposed between the respective magnetic regenerators 514 to generate variable magnetic fields. The magnetic regeneration member 510 may rotate about the shaft 519 using interaction between the magnetic fields generated by the coils 516 and a magnetic field generated by the permanent magnet 520. For example, when driving current is supplied to the coils 516 located adjacent to the permanent magnet 520 while being located with respect to the permanent magnet 520 in a clockwise direction such that magnetic fields having opposite directions to the magnetic field generated by the permanent magnet 520 are generated in the coils 516, the magnetic regeneration member 510 including the coils 516 rotates in the clockwise direction due to repulsive force generated between the permanent magnet 520 and the coils 516.

The high-temperature side heat exchanger 530 and the low-temperature side heat exchanger 540 are disposed on a circulation channel of the heat transfer fluid arranged in an opposite manner in a state in which the magnetic regeneration member 510 is disposed between the circulation channels. Heating may be performed using a heat emission effect of the high-temperature side heat exchanger 530 and cooling may be performed using a heat absorption effect of the low-temperature side heat exchanger 540.

The pump 560 is disposed on the circulation channel of the heat transfer fluid to circulate the heat transfer fluid.

The first channel switching valve 570 and the second channel switching valve 580, which switch a channel of the heat transfer fluid having passed through the magnetic regenerators 514, are coupled to opposite sides of the magnetic regeneration member 510.

Figure 24:
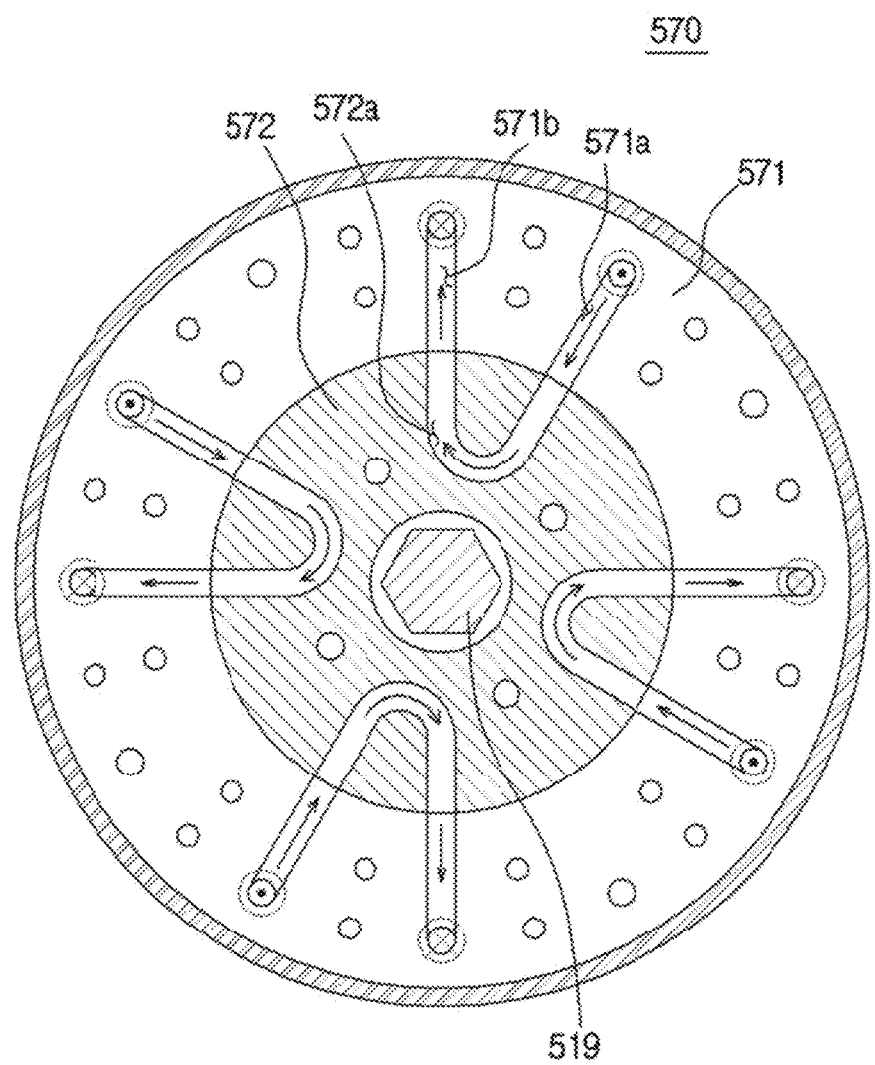
FIG. 24 is a view taken along line II-II' of FIG. 22 showing a channel switching structure of a first channel switching valve.
Figure 25:
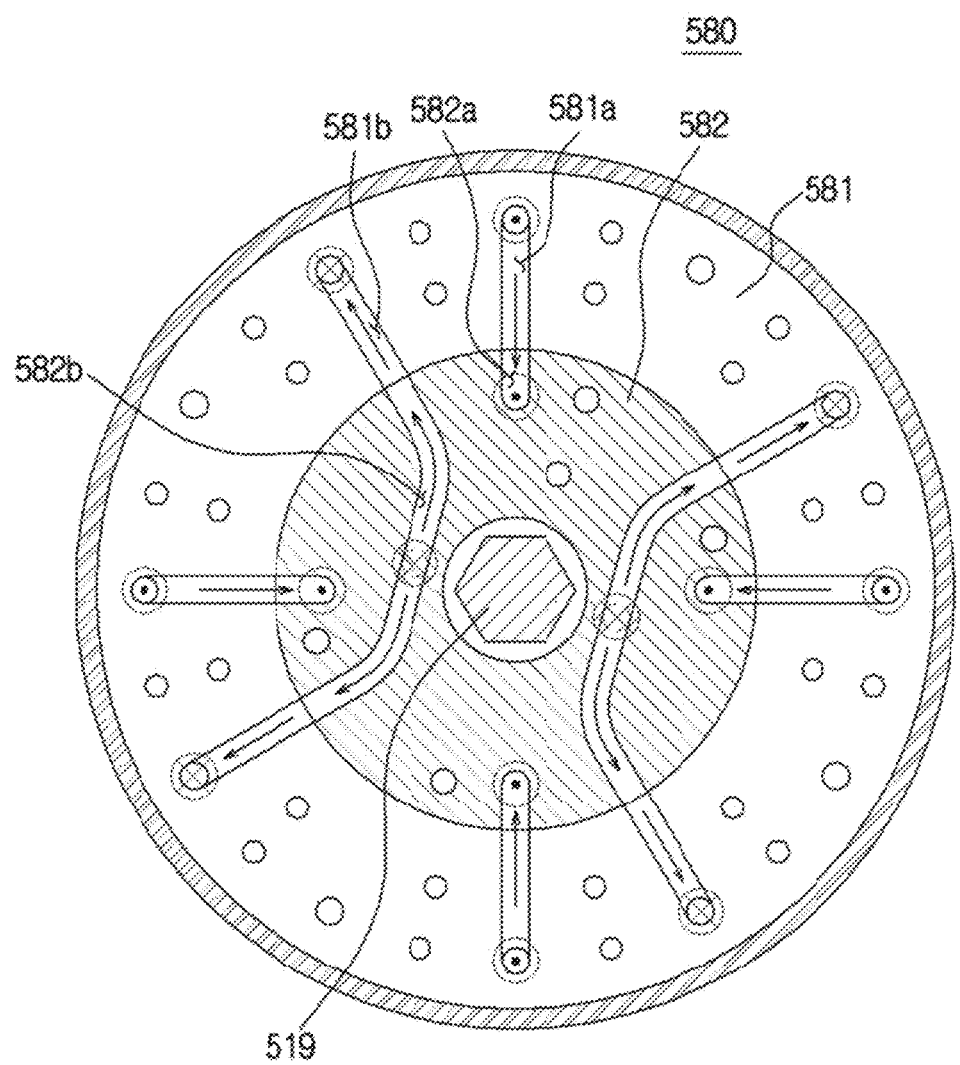
FIG. 25 is a view taken along line III-III' of FIG. 22 showing a channel switching structure of a second channel switching valve.
Figure 26:
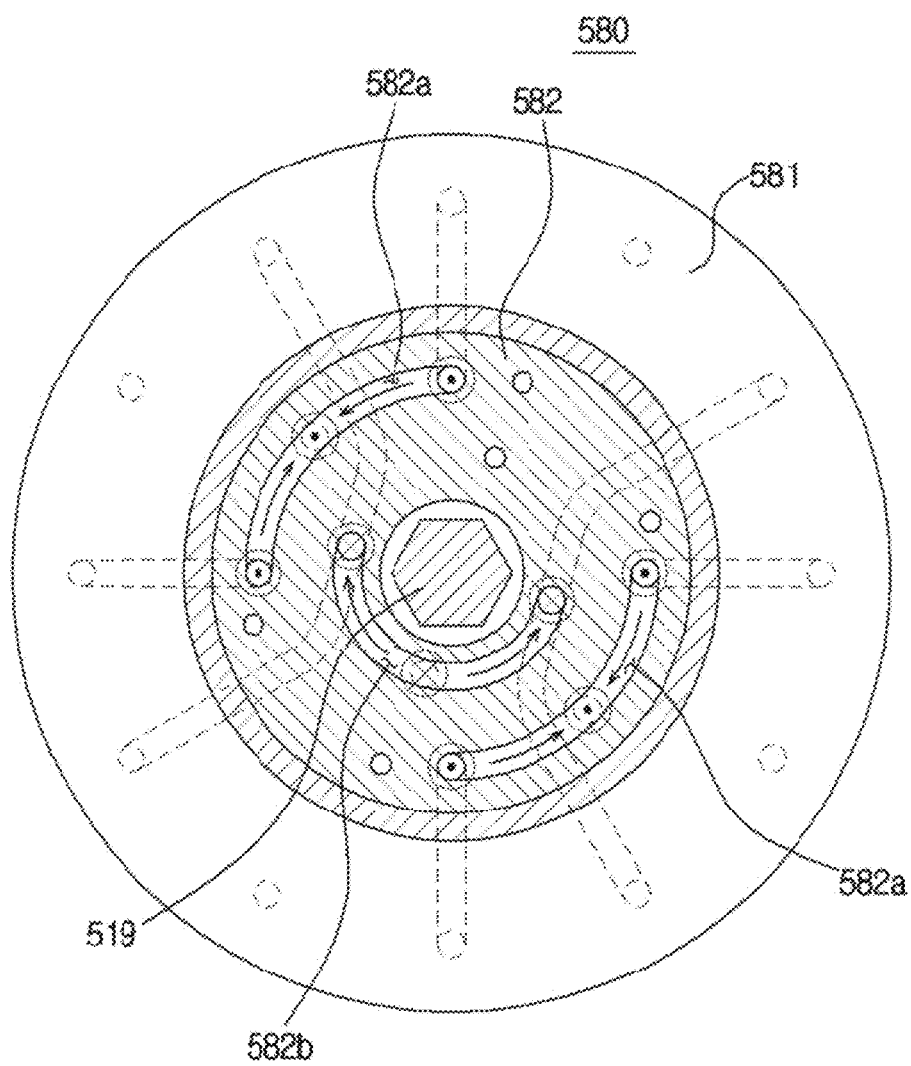
FIG. 26 is a view taken along line IV-IV' of FIG. 22 showing the channel switching structure of the second channel switching valve.

FIG. 24 is a view taken along line II-II' of FIG. 22 showing a channel switching structure of the first channel switching valve, FIG. 25 is a view taken along line III-III' of FIG. 22 showing a channel switching structure of the second channel switching valve, and FIG. 26 is a view taken along line IV-IV' of FIG. 22 showing the channel switching structure of the second channel switching valve.

As shown in FIG. 24, the first channel switching valve 570 is coupled to one side of the magnetic regeneration member 510 in an axial direction of the magnetic regeneration member 510 such that the heat transfer fluid flows between a magnetic regenerator 514a magnetized by the permanent magnet 520 and a demagnetized magnetic regenerator 514b.

The first channel switching valve 570 includes a first valve unit 571 rotating simultaneously with the magnetic regeneration member 510 and a second valve unit 572 to rotatably support the first valve unit 571.

The first valve unit 571 is formed approximately in the shape of a disc. The first valve unit 571 includes a plurality of first channels 571a to guide flow of the heat transfer fluid such that the heat transfer fluid having passed through the demagnetized magnetic regenerator 514b is introduced into the first channel switching valve 570 and a plurality of second channels 571b to guide flow of the heat transfer fluid such that the heat transfer fluid having passed through the first channel switching valve 570 flows to the magnetized magnetic regenerator 514a. The first channels 571a and the second channels 571b are connected to the connectors 518a provided at one ends of the through holes 518 and radially arranged in a circumferential direction of the first valve unit 571.

The second valve unit 572 is formed approximately in the shape of a disc and is coupled to the inner circumference of the first valve unit 571. The second valve unit 572 includes a plurality of connection channels 572a respectively connected between the first channels 571a and the second channels 571b such that the heat transfer fluid introduced through the first channels 571a flows to the second channels 571b. Each connection channel 572a is formed approximately in a U shape. The connection channels 572a guide the heat transfer fluid introduced into the second valve unit 572 through the first channels 571a to the second channels 571b.

In addition, the second valve unit 572 includes a receiving part 575 to receive a fluid supplied from outside, a plurality of heat exchange fins 577 provided inside the receiving part 575, and a plurality of fluid supply pipes 579 communicating with the receiving part 575 while extending through one side of the second valve unit 572 to supply the external fluid into the receiving part 575. The external fluid is a target to be cooled. For example, for a refrigerator, the external fluid may be air in the refrigerator. For an air conditioner, the external fluid may be indoor air.

The receiving part 575 is partitioned from the connection channels 572a so as not to communicate with the connection channels 572a. The heat exchange fins 577 protrude from one surface 575a of the receiving part 575 adjacent to the connection channels 572a in an axial direction of the second valve unit 572. The receiving part 575 and the heat exchange fins 577 may be formed of a material, such as copper or aluminum, exhibiting high thermal conductivity to effectively perform heat exchange between the heat transfer fluid and the external fluid.

The connection channels 572a, the receiving part 575, and the heat exchange fins 577 constitute the low-temperature side heat exchanger 540. That is, the low-temperature side heat exchanger 540 is included in the second valve unit 572 of the first channel switching valve 570. The heat transfer fluid, introduced into the connection channels 572a through the first channels 571a of the first valve unit 571, directly exchanges heat with the external fluid through the heat exchange fins 577 while flowing along the connection channels 572a. Consequently, the channel structure between the first channel switching valve 570 and the low-temperature side heat exchanger 540 is simplified, thereby reducing heat loss and increasing heat exchange efficiency. As a result, the cooling performance of the magnetic cooling apparatus 500 is improved. In addition, since the low-temperature side heat exchanger 540 is included in the second valve unit 572 of the first channel switching valve 570, the first magnetic regenerator 514a and the second magnetic regenerator 514b are directly connected via the first channel switching valve 570. Consequently, an additional pipe connected among the magnetized magnetic regenerator 514a, the first channel switching valve 570, and the demagnetized magnetic regenerator 514b may not be necessary and heat loss generated when the heat transfer fluid passes through the demagnetized magnetic regenerator 514b, the first channel switching valve 570, and the magnetized magnetic regenerator 514a may be reduced, thereby improving overall cooling performance of the magnetic cooling apparatus 500.

Between the inner circumference of the first valve unit 571 and the outer circumference of the second valve unit 572 is provided a bearing 574 to support the first valve unit 571 such that the first valve unit 571 rotates about the second valve unit 572 simultaneously with the magnetic regenerators 514. In addition, at least one sealing member 576 is provided between the inner circumference of the first valve unit 571 and the outer circumference of the second valve unit 572 to prevent the heat transfer fluid flowing from the first valve unit 571 to the second valve unit 572 or from the second valve unit 572 to the first valve unit 571 from leaking from the first valve unit 571 and the second valve unit 572.

As shown in FIGS. 25 and 26, the second channel switching valve 580 is coupled to the other side of the magnetic regeneration member 510, which is opposite to one side of the magnetic regeneration member 510 to which the first channel switching valve 570 is coupled, in the axial direction of the magnetic regeneration member 510 to guide the heat transfer fluid having passed through the magnetized magnetic regenerator 514*a* to the high-temperature side heat exchanger 530 and to guide the heat transfer fluid heat-exchanged at the high-temperature side heat exchanger 530 to the demagnetized magnetic regenerator 514*b*.

The second channel switching valve 580 includes a third valve unit 581 rotating simultaneously with the magnetic regenerators 514 and a fourth valve unit 582 to rotatably support the third valve unit 581.

The third valve unit 581 is formed approximately in the shape of a disc. The third valve unit 581 includes a plurality of first guide channels 581*a* to guide flow of the heat transfer fluid such that the heat transfer fluid having passed through the magnetized magnetic regenerator 514*a* is introduced into the second channel switching valve 580 and a plurality of second guide channels 581*b* to guide flow of the heat transfer fluid such that the heat transfer fluid having passed through the second channel switching valve 580 flows to the demagnetized magnetic regenerator 514*b*. The first guide channels 581*a* and the second guide channels 581*b* are connected to the connectors 518*b* provided at the other ends of the through holes 518 and radially arranged in a circumferential direction of the third valve unit 581.

The fourth valve unit 582 is formed approximately in the shape of a disc and is coupled to the inner circumference of the third valve unit 581. The fourth valve unit 582 includes at least one third guide channel 582*a* to guide the heat transfer fluid introduced into the fourth valve unit 582 through the first guide channels 581*a* to the high-temperature side heat exchanger 530 and at least one fourth guide channel 582*b* to guide the heat transfer fluid introduced into the fourth valve unit 582 via the pump 560 to the second guide channels 581*b*. The third guide channel 582*a* communicates with the first guide channels 581*a* to collect the heat transfer fluid having passed through the first guide channels 581*a* and to guide the collected heat transfer fluid to the high-temperature side heat exchanger 530. Consequently, the third guide channel 582*a* may be a collection channel. The fourth guide channel 582*b* distributes the heat transfer fluid introduced into the fourth valve unit 582 via the high-temperature side heat exchanger 530 and the pump 560 into two or more channels and then guides the heat transfer fluid into the second guide channels 581*b*. Consequently, the fourth guide channel 582*b* may be a distribution channel. The first guide channels 581*a* and the second guide channels 581*b* guide the heat transfer fluid to the inside and outside of the third valve unit 581 approximately in a radial direction of the third valve unit 581. The third guide channel 582*a* and the fourth guide channel 582*b* guide the heat transfer fluid approximately in a circumferential direction of the fourth valve unit 582.

The third guide channel 582*a* and the fourth guide channel 582*b* include axial channel sections 582*c* and 582*d* (see FIGS. 27 and 28) formed through the fourth valve unit 582 in the axial direction thereof. As a result, the third guide channel 582*a* and the fourth guide channel 582*b* do not communicate with each other. Consequently, the second channel switching valve 580 may simultaneously independently perform collection and distribution of the heat transfer fluid.

To the fourth valve unit 582 is coupled the plurality of transfer pipes 550 communicating with the third guide channel 582*a* and the fourth guide channel 582*b* to transfer the heat transfer fluid from the fourth valve unit 582 to the high-temperature side heat exchanger 530 or to transfer the heat transfer fluid having passed through the high-temperature side heat exchanger 530 to the fourth valve unit 582.

Between the inner circumference of the third valve unit 581 and the outer circumference of the fourth valve unit 582 is provided a bearing 584 to support the third valve unit 581 such that the third valve unit 581 rotates about the fourth valve unit 582 simultaneously with the magnetic regenerators 514. In addition, at least one sealing member 586 is provided between the inner circumference of the third valve unit 581 and the outer circumference of the fourth valve unit 582 to prevent the heat transfer fluid flowing from the third valve unit 581 to the fourth valve unit 582 or from the fourth valve unit 582 to the third valve unit 581 from leaking from the third valve unit 581 and the fourth valve unit 582.

As described above, the first valve unit 571 of the first channel switching valve 570 and the third valve unit 581 of the second channel switching valve 580 rotate about the shaft 519 together with the magnetic regeneration member 510 and the second valve unit 572 of the first channel switching valve 570 and the fourth valve unit 582 of the second channel switching valve 580 are fixed to one side and the other side of the magnetic regeneration member 510 to support rotation of the first valve unit 571 and the third valve unit 581. For this reason, the first valve unit 571 and the third valve unit 581 may be a first rotary unit and a second rotary unit and the second valve unit 572 and the fourth valve unit 582 may be a first fixed unit and a second fixed unit.

Although not shown, the first valve unit 571 and the third valve unit 581 may be fixed to one side and the other side of the magnetic regeneration member 510 and the second valve unit 572 and the fourth valve unit 582 may be coupled to the shaft 519 such that second valve unit 572 and the fourth valve unit 582 rotate together with the shaft 519.

Hereinafter, a description will be given of a process of the heat transfer fluid emitting heat to outside or absorbing heat from outside while circulating through the magnetic regeneration member 510, the high-temperature side heat exchanger 530, and the low-temperature side heat exchanger 540.

Figure 27:
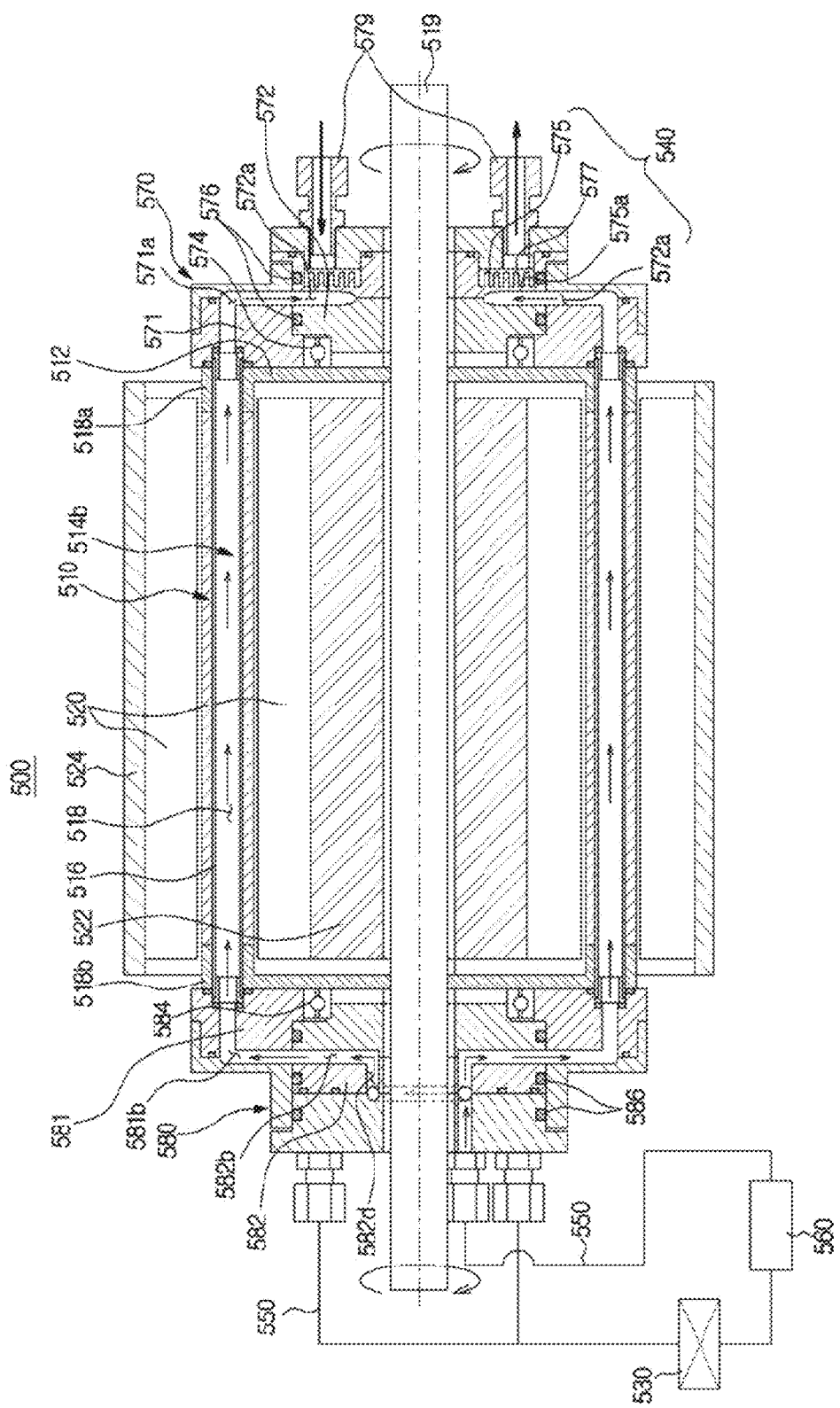

FIGS. 27 and 28 are views showing flow of the heat transfer fluid flowing in the magnetic cooling apparatus according to an embodiment.

When the shaft 519 rotates due to magnetic interaction between the coils 516 and the permanent magnet 520, the housing 512 coupled to the shaft 519 and the magnetic regenerators 514 disposed at the housing 512 rotate about the shaft 519. The magnetic regenerators 514 rotating about the shaft 519 sequentially enter and leave the magnetic fields generated inside and outside the housing 512, which is repeated. When the magnetic regenerators 514 enter the magnetic field, the magnetic regenerators 514 are magnetized. As a result, the heat transfer fluid passing through the magnetic regenerators 514 absorbs heat from the magnetic regenerators 514. When the magnetic regenerators 514 leave the magnetic field, the magnetic regenerators 514 are demagnetized. As a result, the heat transfer fluid passing through the magnetic regenerators 514 transfer heat to the magnetic regenerators 514.

As shown in FIG. 27, the heat transfer fluid having emitted heat outside at the high-temperature side heat exchanger 530 is introduced into the second channel switching valve 580 through the transfer pipe 550.

The heat transfer fluid introduced into the second channel switching valve 580 is distributed into the fourth guide channels 582b and is then introduced into the demagnetized magnetic regenerator 514b through the second guide channels 581b of the third valve unit 581. The heat transfer fluid introduced into the demagnetized magnetic regenerator 514b transfers heat to the demagnetized magnetic regenerator 514b and is introduced into the first channel switching valve 570 in a cooled state. The heat transfer fluid introduced into the first channel switching valve 570 flows in the connection channels 572a of the second valve unit 572 through the first channels 571a of the first valve unit 571. While flowing in the connection channels 572a, the heat transfer fluid absorbs heat from the external fluid through the heat exchange fins 577.

As shown in FIG. 28, the heat transfer fluid absorbing heat while flowing in the connection channels 572a is introduced into the magnetized magnetic regenerator 514a through the second channels 571b of the first valve unit 571.

The heat transfer fluid introduced into the magnetized magnetic regenerator 514a absorbs heat from the magnetized magnetic regenerator 514a and is introduced into the second channel switching valve 580 in a heated state. The heat transfer fluid introduced into the second channel switching valve 580 is introduced into the fourth valve unit 582 through the first guide channels 581a of the third valve unit 581, is collected in the third guide channel 582a, is transferred to the high-temperature side heat exchanger 530 through the transfer pipe 550, and emits the heat absorbed from the magnetized magnetic regenerator 514a to outside.

The above processes forms one heat exchange cycle. The magnetic regenerators 514 are magnetized and demagnetized while rotating about the shaft 519 to continuously repeat the heat exchange cycle, thereby obtaining high temperature or low temperature necessary for heating or cooling.

In the above description, the magnetic cooling apparatus 500 is configured to have a structure in which the permanent magnet 520 is fixed and the magnetic regeneration member 510 rotates. However, embodiments of the present invention are not limited thereto. For example, the magnetic cooling apparatus 500 may be configured to have a structure in which the magnetic regeneration member 510 is fixed and the permanent magnet 520 revolves round the magnetic regeneration member 510 to apply a magnetic field to the magnetic regenerators 514 or to remove the magnetic field from the magnetic regenerators 514. In this case, the shaft 519 may not be coupled and fixed to the center of the housing 512 but the center of the permanent magnet 520.

As is apparent from the above description, the coils interacting with the magnetic fields to magnetize or demagnetize the magnetic regenerators are coupled to the magnetic regenerators such that the magnetic regenerators reciprocate or rotate, thereby minimizing the magnetic cooling apparatus. In addition, the channel switching member to switch the channel of the heat transfer fluid directly performs heat transfer between the heat transfer fluid and the external fluid, thereby minimizing heat loss.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A magnetic cooling apparatus comprising:
   a plurality of magnetic regenerators comprising a plurality of magnetocaloric materials to emit heat when magnetized and to absorb heat when demagnetized, the plurality of magnetic regenerators being rotatably disposed on a circumference of a cylindrical rotation type magnetic regeneration member having a predetermined radius;
   at least one coil disposed on the circumference of the cylindrical rotation type magnetic regeneration member and coupled to the plurality of magnetic regenerators; and
   a plurality of permanent magnets provided inside and outside the circumference of the cylindrical rotation type magnetic regeneration member to generate a magnetic field to magnetize or demagnetize the plurality of magnetic regenerators, wherein
   the at least one coil interacts with the magnetic field generated by the plurality of permanent magnets to rotate the plurality of magnetic regenerators.

2. The magnetic cooling apparatus according to claim 1, wherein the at least one coil generates a magnetic field having an opposite direction to the magnetic field of the plurality of permanent magnets.

3. The magnetic cooling apparatus according to claim 1, wherein the at least one coil generates a magnetic field having a same direction as the magnetic field of the plurality of permanent magnets.

4. The magnetic cooling apparatus according to claim 1, further comprising:
   at least one first channel switching valve coupled to one ends of the magnetic regenerators in an axial direction of the circumference of the cylindrical rotation type magnetic regeneration member to guide a heat transfer material discharged from a demagnetized one of the plurality of magnetic regenerators to a magnetized one of the plurality of magnetic regenerators;
   a heat exchanger in which the heat transfer material absorbs heat energy from the one of the plurality of magnetized magnetic regenerators; and
   at least one second channel switching valve coupled to other ends of the plurality of magnetic regenerators in the axial direction of the circumference of the cylindrical rotation type magnetic regeneration member to guide the heat transfer material discharged from the one of the plurality of magnetized magnetic regenerators to the heat exchanger and to guide the heat transfer material discharged from the heat exchanger to the one of the plurality of demagnetized magnetic regenerators.

5. The magnetic cooling apparatus according to claim 4, wherein the first channel switching valve comprises a rotary unit having a first channel connected to the one of the plurality of magnetized magnetic regenerators and a second channel connected to the one of the plurality of demagnetized magnetic regenerators, the rotary unit rotating together with the plurality of magnetic regenerators, and a fixed unit having a connection channel connected between the first channel and the second channel, the fixed unit rotatably supporting the rotary unit.

6. The magnetic cooling apparatus according to claim 5, wherein the heat transfer material having transferred heat energy to the one of the plurality of demagnetized magnetic regenerators absorbs heat energy from the fixed unit.

7. A magnetic cooling apparatus comprising:
a magnetic field generation member configured to generate a static magnetic field; and
a magnetic regeneration member having:
a plurality of magnetic regenerators configured to move into the static magnetic field or out of the static magnetic field, and to emit heat energy when magnetized by the static magnetic field and to absorb heat energy when demagnetized; and
a coil coupled to and configured to move with at least one of the plurality of magnetic regenerators and to generate a variable magnetic field, a direction of the variable magnetic field being changeable,
wherein the at least one of the plurality of magnetic regenerators and the coil are moved by an interaction between the variable magnetic field and the static magnetic field.

8. The magnetic cooling apparatus according to claim 7, wherein the coil generates the variable magnetic field having an opposite direction to the static magnetic field such that the at least one of the plurality of magnetic regenerators moves into the static magnetic field.

9. The magnetic cooling apparatus according to claim 7, wherein the coil generates the variable magnetic field having a same direction as the static magnetic field such that the at least one of the plurality of magnetic regenerators moves out of the static magnetic field.

10. The magnetic cooling apparatus according to claim 8, wherein the coil does not generate a magnetic field such that a movement of the at least one of the plurality of magnetic regenerators is continued.

11. The magnetic cooling apparatus according to claim 7, wherein the at least one of the plurality of magnetic regenerators and the coil are disposed between a first portion of the magnetic field generation member and a second portion of the magnetic field generation member.

12. The magnetic cooling apparatus according to claim 11, wherein the variable magnetic field is changed depending on whether the at least one of the plurality of magnetic regenerators moves into the static magnetic field or out of the static magnetic field.

13. The magnetic cooling apparatus according to claim 12, wherein the at least one of the plurality of magnetic regeneration members reciprocates in a direction perpendicular to a direction of the static magnetic field.

14. The magnetic cooling apparatus according to claim 7, wherein the plurality of magnetic regenerators are disposed on a circumference of the magnetic field generation member having a predetermined radius and the coil is disposed between the plurality of magnetic regenerators.

15. The magnetic cooling apparatus according to claim 14, wherein the magnetic field generation member generates the magnetic field in a radial direction.

16. The magnetic cooling apparatus according to claim 15, wherein the magnetic regeneration member rotates in a direction perpendicular to the magnetic field generated by the magnetic field generation member.

17. The magnetic cooling apparatus according to claim 7, further comprising a channel switching member to guide a heat transfer material having passed through a demagnetized one of the plurality of magnetic regenerators to a magnetized one of the plurality of magnetic regenerators.

\* \* \* \* \*

UNITED STATES PATENT AND TRADEMARK OFFICE
CERTIFICATE OF CORRECTION

PATENT NO. : 9,964,344 B2  
APPLICATION NO. : 14/312961  
DATED : May 8, 2018  
INVENTOR(S) : Jin Han Kim et al.

Page 1 of 1

It is certified that error appears in the above-identified patent and that said Letters Patent is hereby corrected as shown below:

In the Claims

Column 30, Line 13:
In Claim 13, delete "regeneration members" and insert -- regenerators --, therefore.

Signed and Sealed this
Second Day of October, 2018

Andrei Iancu
*Director of the United States Patent and Trademark Office*